United States Patent
Heinonen et al.

(10) Patent No.: US 6,968,153 B1
(45) Date of Patent: Nov. 22, 2005

(54) APPARATUS, METHOD AND SYSTEM FOR A BLUETOOTH REPEATER

(75) Inventors: Tomi Heinonen, Tampere (FI); Timo M. Laitinen, Tampere (FI); Jarkko Lempiö, Nokia (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 10/097,226

(22) Filed: Mar. 13, 2002

(51) Int. Cl.⁷ .............................................. H04B 1/00
(52) U.S. Cl. ...................... 455/11.1; 455/41.2; 370/338
(58) Field of Search .............................. 455/11.1, 13.1, 455/41.2, 445, 517–519; 370/338, 389; 709/220–221

(56) References Cited

U.S. PATENT DOCUMENTS 5,850,592 A * 12/1998 Ramanathan .................. 455/7
6,055,429 A * 4/2000 Lynch ......................... 455/445
6,795,688 B1 * 9/2004 Plasson et al. .............. 455/41.2

* cited by examiner

Primary Examiner—Nick Corsaro
(74) Attorney, Agent, or Firm—Morgan & Finnegan, L.L.P.

(57) ABSTRACT

An apparatus, method and system to extend the range of effective communication as between Bluetooth enabled devices. A Bluetooth repeater may receive Bluetooth communications from an originating Bluetooth enabled device within range and then forward the same data to an intended recipient that was outside the range of the originating Bluetooth enabled device. In one embodiment, the data is forwarded with minor modifications to the source address so that subsequent message replies will be sent to the Bluetooth repeater for forwarding to the proper message originator. Source, destination, and repeater transceiver addresses are stored in the translation database to insure proper forwarding of Bluetooth messages between out of range Bluetooth devices.

120 Claims, 11 Drawing Sheets

US 6,968,153 B1

APPARATUS, METHOD AND SYSTEM FOR A BLUETOOTH REPEATER

FIELD

The present invention relates generally to an apparatus, method and system to route information from a wireless device across a communications network. More particularly, the disclosed invention relates to an apparatus, method and system to enable short range radio frequency ("RF") wireless point to point communications to be bridged across a communications network.

BACKGROUND

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations. There are many forms of networks such as Local Area Networks (LANs), Wide Area Networks (WANs), Pico networks, etc.

Bluetooth Protocol (BT)

Bluetooth is a wireless technology that operates in the unlicensed Industrial, Scientific, and Medical (ISM) radio band of 2.4 GHz. Bluetooth technology includes a number of protocols that allow Bluetooth enabled devices to operate in a peer to peer environment forming piconets.

The Bluetooth protocol and specification may be found in: Bluetooth system; Specification Volumes 1 and 2, Core and Profiles: Version 1.1, $22^{nd}$ February, 2001.

SUMMARY

One embodiment of the present invention solves the problem of allowing Bluetooth (BT) enabled devices to communicate with one another when they would otherwise be out of normal communications range. This is a very useful feature because in many instances BT devices have limited range.

In one embodiment of the present invention, the Bluetooth repeater apparatus comprises a processor; a memory, communicatively connected to the processor; a program, stored in the memory, including, a module to receive a communication message from a Bluetooth (BT) device at a repeater device (BT repeater), a module to determine with which desired target BT device (target device), a module to correlate the received communications message with an identifier in the BT repeater (BT-repeater-identifier), and a module to send the communications message to an other BT device, which is disposed in communication with the BT repeater, from the BT repeater.

In another embodiment of the present invention, the Bluetooth apparatus comprises a processor; a memory, communicatively connected to the processor; a program, stored in the memory, including, a module to send a communication message from a BT device to a repeater device (BT repeater), and a module to effect the transmission of the communications message from the BT repeater.

In another embodiment of the present invention, the Bluetooth apparatus comprises a processor; a memory, communicatively connected to the processor; a program, stored in the memory, including, a module to receive a communication message from a repeater device (BT repeater) as relayed from a BT device, wherein the BT device includes a BT transceiver, wherein the repeater device includes a BT transceiver.

In another embodiment of the present invention, a memory for access by a program module to be executed on a processor, comprises a data structure stored in the memory. The data structure has interrelated data types, wherein instruction signals embody data, including, a data type to store a Bluetooth (BT) transceiver address (transceiver-address-at-originating-device) for an originating device, a data type to store a BT transceiver address (transceiver-address-at-BT-repeater) for a repeater device, and a data type to store a BT transceiver address (transceiver-address-at-other-device) for an other device, In another embodiment of the present invention, a Bluetooth repeater device is combined with an OBEX bridge apparatus.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain non-limiting example embodiments of the disclosure.

DETAILED DESCRIPTION

Bluetooth Enabled Client Terminal

FIG. 1 is a schematic overview of non-limiting example embodiments of short range radio frequency (RF) effective cover areas as provided by various Bluetooth devices.

Bluetooth Device Range

Figure 1A:
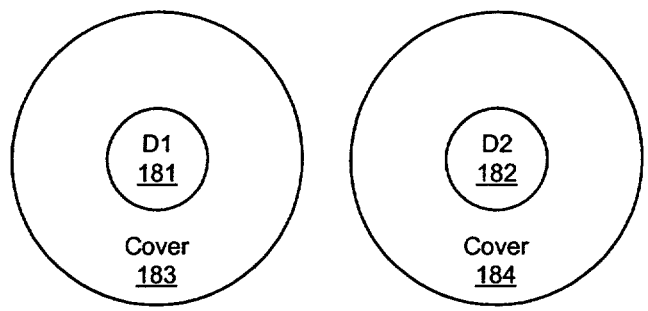
FIG. 1A is a schematic overview of one non-limiting example embodiment two Bluetooth transceiver enabled devices.

FIG. 1A is a schematic overview of two Bluetooth transceiver enabled devices (D1) 181 and (D2) 182. The effective area of coverage (the "coverage area") 183, 184 offered by a given Bluetooth enabled device (e.g., D1 or D2) will vary based on the signal strength of the Bluetooth transceiver of the device. For example, a typical Bluetooth device has a radial range of approximately 10 meters, however, with a 10 milliwatt transceiver the effective radial coverage area may be extended to approximately 100 meters. In other embodiments, various antenna constructs may focus and/or reshape the coverage area into a non-radial geometry.

Thus, FIG. 1A illustrates a scenario when D1 and D2 are outside each other's coverage areas. In such a scenario, no communications may take place between D1 and D2.

For communications to take place between D1 and D2, the coverage area 183 of D1 (the "originating device") must reach and/or overlap the transceiver and/or its antenna within D2 (the "recipient device") for sending communications from D1 to D2, and in turn, the coverage area 184 of D2 must reach and/or overlap the transceiver within D1 to receive communications at D1 from D2.

Bluetooth Repeater Extending Range

Figure 1B:
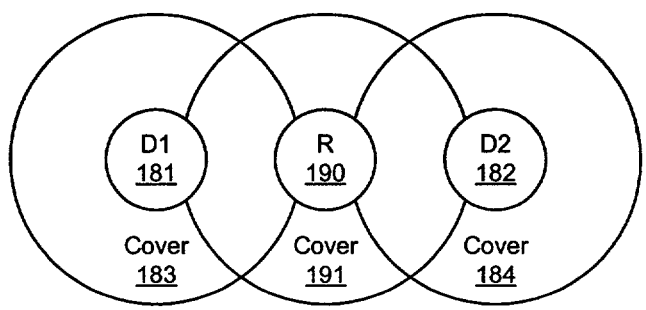
FIG. 1B is a schematic overview of one non-limiting example embodiment two Bluetooth transceiver enabled devices that are outside each other's coverage areas and are nevertheless in communication with one another as enabled by a Bluetooth repeater.

FIG. 1B is a schematic overview of two Bluetooth transceiver enabled devices D1 and D2 that are outside each other's coverage areas 183, 184 and are nevertheless in communication with one another as enabled by a Bluetooth repeater R1 190 and its coverage area 191. The Bluetooth devices themselves, D1 and D2, are not specially enabled in anyway to interact with the Bluetooth repeater and communications between D1 and D2 occur transparently through the Bluetooth repeater R1.

Figure 1C:
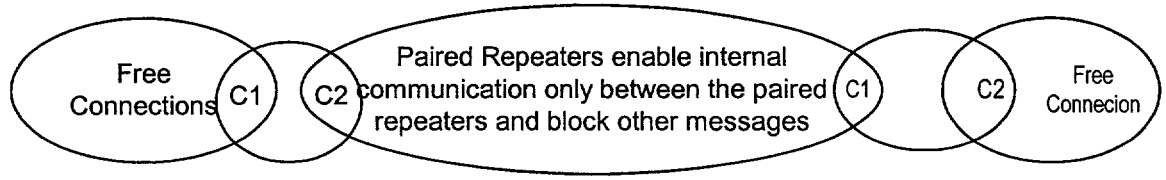
FIG. 1C is a schematic overview of one non-limiting example embodiment a Bluetooth repeater shows that paired Bluetooth chips may be used to extend communications between two free connection areas.

FIG. 1C is a schematic overview of a Bluetooth repeater shows that paired Bluetooth chips 193, 193b may be used to extend communications between two free connection areas 194, 194b. Each pair is comprised of two Bluetooth chips C1 and C2. In one embodiment, the repeater pairs 193, 193b block out all communications other than transmissions coming from the other pair. In an alternative embodiment, a portion of each repeater pair is replaced with another communications link such as, but not limited to: Bluetooth with directed antenna; cellular; IEEE 802.11a, b and g; physical links (i.e., Ethernet, twisted pair wiring, CAT 5 cabling, etc.); and/or the like. In embodiments where non-Bluetooth communications are employed, one Bluetooth chip from each of the repeater pairs may be replaced with the alternative communication link technology that is desired. In such embodiments, a Bluetooth repeater may significantly extend the effective range of Bluetooth devices in proximity of its transceivers.

Bluetooth Device Configurations

Figure 1D:
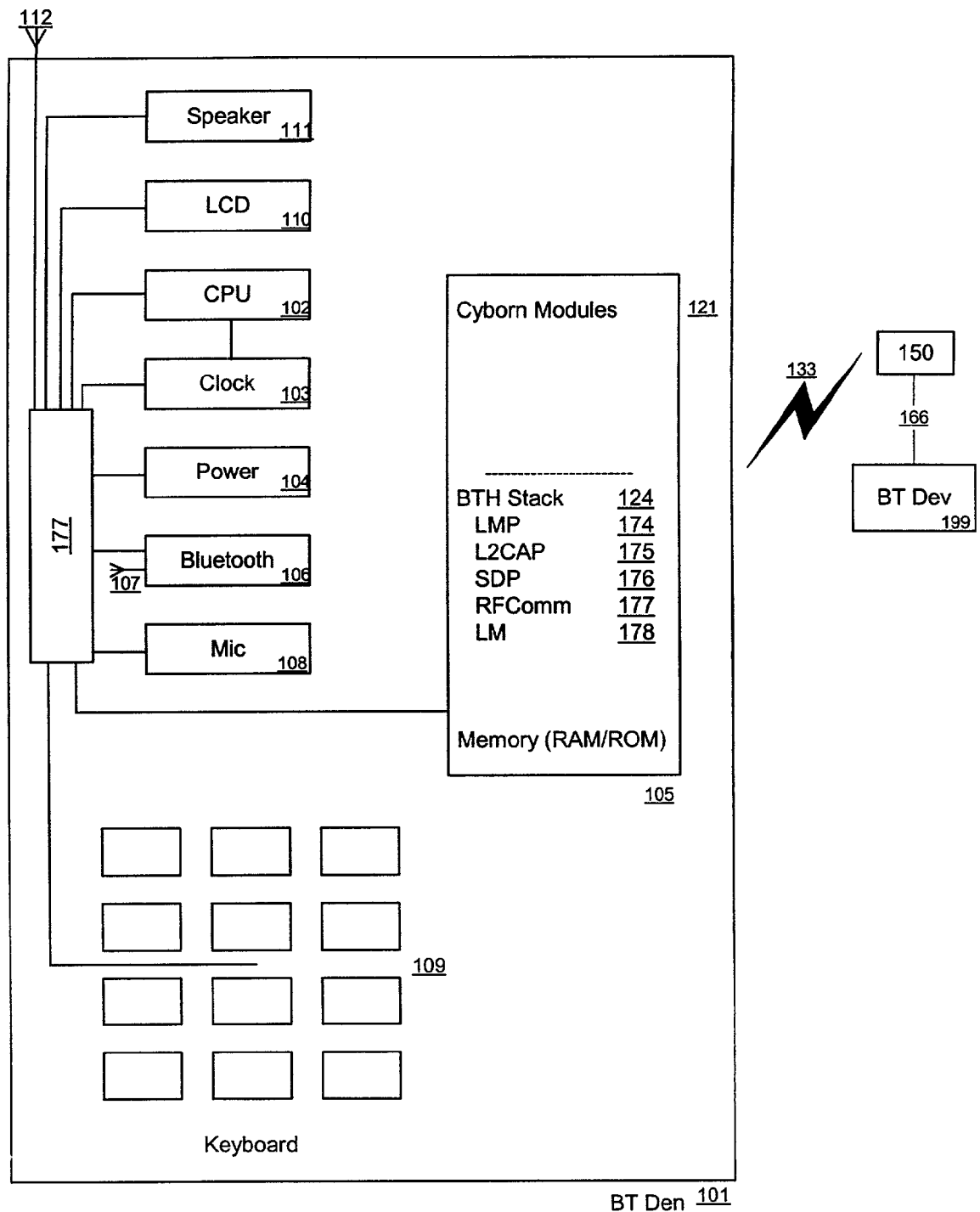
FIG. 1D illustrates one non-limiting example embodiment of a Bluetooth enabled device and/or client.

FIG. 1D illustrates one non-limiting example embodiment of a Bluetooth enabled device and/or client ("client" or "Bluetooth device") 101, which may comprise a clock 103, central processing unit (CPU) 102, a memory 105, a power source 104, input 108, 109 and output 110, 111 (I/O) components 112, 105, 107. Regardless of any actual configuration, as long as a client is enabled with a Bluetooth chip, then a Bluetooth repeater, which will be discussed in greater detail below, may extend the client's range and/or enable Bluetooth protocol communications with other Bluetooth enabled devices within the range of the Bluetooth repeater. The power source 104 provides power to the client. One of the I/O components is a Bluetooth chip 106 such as Cambridge Silicon Radio Inc.'s BlueCore IC and Bluetooth transceiver 107 capable of transmitting and receiving Bluetooth protocol communications (Bluetooth transceiver). It is to be understood that the use of Bluetooth components/protocols in the exemplary embodiment is intended to be illustrative rather than limiting. Optionally, the client may also employ other wireless protocol transceivers 112 such as those employed for cellular telecommunications. Conventionally, although not necessarily, the client components are all interconnected and/or communicating through a system bus 177. The system clock 103 typically has a crystal oscillator and provides a base signal. The clock is typically coupled to the system bus and various means that will increase or decrease the base operating frequency for other components interconnected in the client. The clock and various components in the client drive signals embodying information throughout the client. Such transmission and reception of signals embodying information throughout the client may be commonly referred to as communications. These communicative signals may further be transmitted, received, and the cause of return and/or reply signal communications beyond the instant client to: communications networks, input devices, computer systems (e.g., servers), bridges, other clients, peripheral devices, repeaters, and/or the like. Of course, any of the above components may be connected directly to one another, connected to the CPU, and/or organized in numerous variations employed as exemplified by various wireless and short range RF enabled devices such as, but not limited to: cellular telephones, Portable Digital Assistants (PDAs), laptop computers, peripheral devices, and/or the like. Optionally the client may include various input/output devices, which are also disposed in communication with the CPU through the system bus and/or directly. Such input devices may include a microphone 108, an input keypad 109, a touch sensitive screen (not shown), and/or like. Output devices may include an LCD 110, a speaker 111, a CRT (not shown), a printing element (not shown), and/or the like.

CPU

The CPU 102 comprises at least one data processor adequate to execute program modules for executing user and/or system-generated requests. The CPU may be a microprocessor such as the Intel Pentium Processor, StrongARM Processor, and/or the like. The CPU interacts with memory through signal passing through conductive conduits to execute stored program code according to conventional data processing techniques. Such signal passing facilitates communication within the communication networks and beyond through various interfaces.

Memory

It is to be understood that the client may employ various forms of memory 105. In a typical configuration, memory 105 will include ROM, RAM, and possibly a fixed storage device, e.g., a hard disk drive. Also, the Bluetooth chip 106 may contain various Bluetooth protocols within its own memory that may be provided to either the CPU 102 and/or memory 105. Generally, any mechanization and/or embodiment allowing a processor to affect the storage and/or retrieval of information is regarded as memory 105. Thus, a client generally requires and makes use of memory. However, memory is a fungible technology and resource, thus, any number of memory embodiments may be employed in lieu of or in concert with one another.

Module Collection

The memory 105 may contain a collection of program modules and/or data such as, but not limited to: an operating system module 130 (operating system); cellular communication protocols (if any) 131; Bluetooth communication protocols including a Bluetooth protocol stack 124; other short range radio frequency protocols (if any); and/or the like. The Bluetooth protocol stack may include a Link Manager (LM) 174, a Logical Link Control and Application Protocol (L2CAP) 175, a Service Discovery Protocol (SDP) 176, RFCOMM 177 (i.e., a serial line emulation protocol), and/or the like. Software modules such as those in the module collection, typically and preferably, are stored in memory 105, they may also be loaded and/or stored in memory such as: peripheral devices, ROM, remote storage facilities through a communications network, various forms of memory, and/or the like.

Operating System

The operating system module 130 is executable program code facilitating the operation of the client. Typically, the operating system facilitates access of I/O, network interfaces, peripheral devices, storage devices, and/or the like. The operating system also may provide user interface functionality allowing the user to interact with the client. Example client operating systems include: Linux, Microsoft Pocket PC, Palm OS, various proprietary cell phone operating systems, and/or the like. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network. Various communication protocols may be used by the client as a subcarrier transport mechanism for interacting with other short range RF enabled devices, such as, but not limited to: TCP/IP 122, Bluetooth (e.g., via RFCOMM), OBEX 121, and/or the like. However, only Bluetooth protocol is required to work in conjunction with a Bluetooth repeater.

Bluetooth Protocols

In memory 105 various Bluetooth protocols 124 and/or other short range RF protocols are stored. The Bluetooth protocols may include a link manager protocol 174 (hereinafter "LM"). The link manager software runs on the CPU in the client to manage communications between itself and other Bluetooth devices. Another protocol is the Service Discovery Protocol 176 (hereinafter "SDP"). After the connection of a Bluetooth client with another device, the Service Discovery Protocol enables the querying and identification of the abilities of other Bluetooth devices. Another protocol is the Logical Link Control and Adaptation Protocol 175 (hereinafter "L2CAP"). The L2CAP provides multiplexing, packet segmentation and reassembly of data as it is communicated between the client and other Bluetooth enabled devices. Another protocol held in memory 105 is the RFCOMM which is a serial line emulation protocol that enables Bluetooth devices to intercommunicate by emulating a serial line. These various protocols interact to encode and decode data as given by the CPU through a base band 107. LM and L2CAP run directly on top of base band 107. RFCOMM and SDP run on top of L2CAP. It should be understood that the above is only one example and Bluetooth device configuration. Configurations will vary in detail and implementation, however, as long as any given configuration employs a Bluetooth protocol, its range may be enhanced with a Bluetooth repeater.

FIG. 1D goes on to illustrate that the client 101 may communicate wirelessly 133 via Bluetooth protocol with another client 101b that is outside the client's 101 range through a Bluetooth repeater 150 and another wireless Bluetooth communications link 166.

Bluetooth Repeater

FIG. 2 illustrates non limiting schematic overviews of a Bluetooth enabled repeater (Bluetooth repeater) in various example embodiments.

Figure 2A:
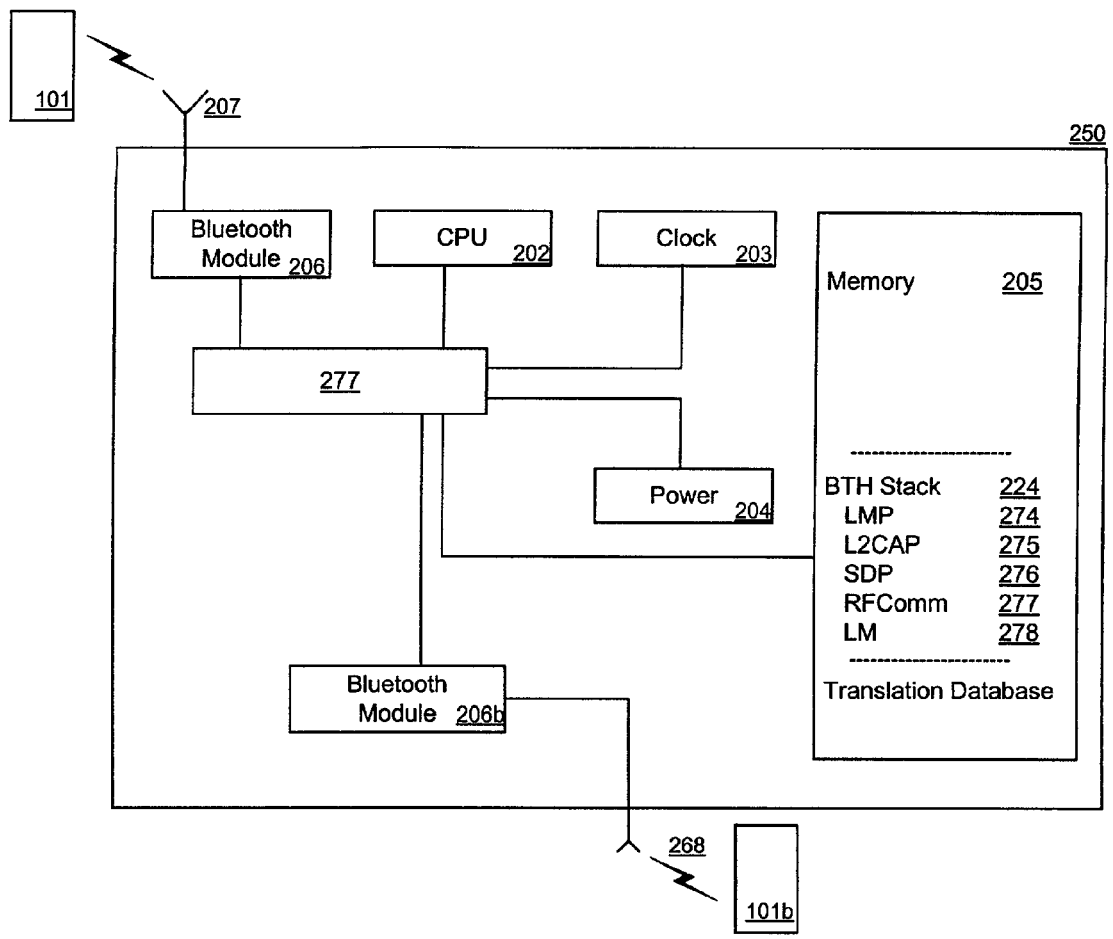
FIG. 2A illustrates one non-limiting example embodiment of a Bluetooth repeater.

Bluetooth Repeater Systemization FIG. 2A illustrates one non-limiting example embodiment of a Bluetooth repeater 250 may comprise a clock 203, central processing unit (CPU) 202, a memory 205, a power source 204, I/O components 220, 206, 207. The power source 204 provides power to the Bluetooth repeater. One of the I/O components is a Bluetooth chip 206 such as Cambridge Silicon Radio Inc.'s BlueCore IC and Bluetooth transceiver 207 capable of transmitting and receiving Bluetooth protocol communications. The Bluetooth repeater 250 employs at least two Bluetooth transceivers 206b, 207b. As discussed above in connection with "Client Systemization" (FIG. 1D), the use of Bluetooth components/protocols in the exemplary embodiment is intended to be illustrative rather than limiting, and that therefore other short range RF technologies may also be employed. Conventionally, although not necessarily, the Bluetooth repeater's components are all interconnected and/or communicating through a system bus 277. The system clock 203 typically has a crystal oscillator and provides a base signal. The clock is typically coupled to the system bus and various means that will increase or decrease the base operating frequency for other components interconnected in the Bluetooth repeater. The clock and various components in the Bluetooth repeater drive signals embodying information throughout the Bluetooth repeater. Such transmission and reception of signals embodying information throughout the Bluetooth repeater may be commonly referred to as communications. These communicative signals may further be transmitted, received, and the cause of return and/or reply signal communications beyond the instant Bluetooth repeater to: communications networks, input devices, computer systems (e.g., servers), peripheral devices, clients, and/or the like. Of course, any of the above components may be connected directly to one another, connected to the CPU, and/or organized in numerous variations employed as exemplified by various short range RF enabled computing devices. The Bluetooth chip 206 enables wireless communications through a wireless transceiver 207. Optionally, the Bluetooth repeater 250 en may contain a network interface 220 such as an Ethernet card, an ISDN card, a DSL card, and/or the like, which enables communications with other communications networks, such as employ OBEX and/or TCP/IP protocols and act as a bridge as well as a repeater. More information on bridge functionality is discussed in U.S. patent application Ser. No. 09/896,635; which was filed on Jun. 29, 2001; entitled Apparatus, method and System for an Object Exchange Bridge; and is herein incorporated by reference. In one non-limiting example embodiment, an OBEX bridge functionality may be incorporated into a Bluetooth repeater to enable both repeating of Bluetooth signals and directing OBEX Bluetooth signals to be routed to desired destinations. Thus, the Bluetooth repeater 250 relays short range RF wireless communications 233, 207 from a client 101 to another client 101b by forwarding 266 the received RF wireless communications 233.

CPU

The CPU 202 comprises at least one data processor adequate to execute program modules for executing user and/or system-generated requests. The CPU may be a microprocessor such as the Intel Pentium Processor, StrongArm, and/or the like. The CPU interacts with memory through signal passing through conductive conduits to execute stored program code according to conventional data processing techniques. Such signal passing facilitates communication within the Bluetooth repeater, through the communication networks, and beyond through various interfaces.

Memory

It is to be understood that the bridge may employ various forms of memory 205. In a typical configuration, memory 205 will include ROM, RAM, and possibly a fixed storage device, e.g., a hard disk drive. Also, the Bluetooth chip 206 may contain various Bluetooth protocols within its own memory that may be provided to either the CPU 102 and/or memory 105. Generally, any mechanization and/or embodiment allowing a processor to affect the storage and/or retrieval of information is regarded as memory 205. Thus, a Bluetooth repeater generally requires and makes use of memory. However, memory is a fungible technology and resource, thus, any number of memory embodiments may be employed in lieu of or in concert with one another.

Module Collection

The memory 205 may contain a collection of program modules and/or data such as, but not limited to: an operating system module 230 (operating system); an Bluetooth address swapper (BAS) module 221; Bluetooth protocol stack 224; other short range RF protocols; a translation database 222, and/or the like. Bluetooth protocol stack may include a Link Manager protocol (LM) 274, a Logical Link Control and Application Protocol (L2CAP) 275, a Service Discovery Protocol (SDP) 276, RFCOMM 277 (i.e., a serial line emulation protocol), and/or the like. Although non-conventional software modules such as those in the module collection, typically and preferably, are stored in memory 205, they may also be loaded and/or stored in memory such as: peripheral devices, ROM, remote storage facilities through a communications network, various forms of memory, and/or the like.

Operating System

=The operating system module 230 is executable program code facilitating the operation of the Bluetooth repeater. Typically, the operating system facilitates access of I/O, network interfaces, peripheral devices, storage devices, and/or the like. The operating system also may provide user interface functionality allowing an administrator to interact with the bridge. An exemplary bridge operating system is Linux. An operating system may communicate to and/or with other modules in a module collection, including itself, and/or facilities of the like. Conventionally, the operating system communicates with other program modules, the BAS, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the client to communicate with other entities through a communications network such as Bluetooth piconet. Various communication protocols may be used by the bridge as a subcarrier transport mechanism for interacting with other short range RF enabled devices, such as, but not limited to: Bluetooth (e.g., via RFCOMM).

Bluetooth Protocols

In memory 205 various Bluetooth protocols 224 and/or other short range RF protocols are stored. The Bluetooth protocols may include a LM protocol 274, SDP 276, L2CAP 275, RFCOMM 277, and Baseband as has already been discussed above. The link manager software runs on the CPU in the bridge to manage communications between itself and other Bluetooth devices such as clients 101. After the connection of the Bluetooth repeater with another device, the Service Discovery Protocol enables the querying and identification of the abilities of other Bluetooth devices. These various protocols interact to encode and decode data as given by the CPU through a base band 207, 207b. LM and L2CAP run directly on top of base band 207, 207b. RFCOMM and SDP run on top of L2CAP.

Bluetooth Address Swapper

Furthermore, within the memory 205 is a Bluetooth address swapper (BAS) module 221. The BAS is responsible for swapping Bluetooth addresses from received Bluetooth communications before forwarding the received communications. In the general case, the BAS removes the Bluetooth address of an originating client from any received Bluetooth messages and replaces it with a Bluetooth repeater address. The BAS interacts with the translation database by saving both the originating and swapped correlated addresses in the translation database. Then when an other client responds to the message forwarded by the Bluetooth repeater, it will be properly addressed and received by the Bluetooth repeater.

Further, the BAS will swap out the originating address on the response from the other client with the Bluetooth address of the Bluetooth repeater, save the corresponding addresses in the translation database. The BAS may then determine to which originating client the response should be forwarded to by looking up the corresponding address from the translation database 222. The BAS may communicate to and/or with other modules in a module collection, including itself, and/or facilities of the like. The BAS communicates with other program modules, user interfaces, and/or the like. For example, the BAS may contain, communicate, generate, obtain, and/or provide program module, system, user, and/or data communications, requests, and/or responses. The BAS, once executed by the CPU, may enable the interaction with communications networks, data, I/O, peripheral devices, program modules, memory, user input devices, and/or the like. The BAS may employ the operating system or itself enable and/or provide protocols that allow the client to communicate with other entities through a communications network such as Bluetooth piconet.

Figure 2B:
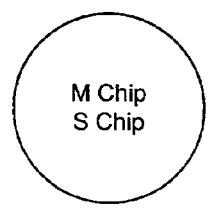
FIG. 2B illustrates one non-limiting example embodiment of a Bluetooth repeater detailing master slave functionality.

Bluetooth Repeater Master Slave Operation FIG. 2B illustrates one non-limiting example embodiment of a Bluetooth repeater 281 detailing master slave functionality. A Bluetooth repeater will be comprised of at least two Bluetooth chips 282, 283. The two chips will at various times allow the Bluetooth repeater to be employed as a master 282 and as a slave 283. Each individual chip may act in the capacity of a master and/or a slave depending upon the requirements of the communication. The Bluetooth repeater will facilitate communications between various Bluetooth devices that are enabled themselves with Bluetooth chips.

When these various devices and/or clients act as a master they generate inquiries. When the Bluetooth repeater 281 receives such an inquiry via its slave chip(s) 283, however, the Bluetooth repeater will not respond to the originating client. Instead, the Bluetooth repeater will repeat the inquiry with its own Bluetooth chip(s) in master mode 282 to a location and/or to other devices within the range of the Bluetooth repeater. However, when the Bluetooth repeater resends or repeats the inquiry that it received via the slave chip 283 with its own master chip, it will replace the Bluetooth address from the originating client with its own Bluetooth address, namely, the master chip Bluetooth address. Such swapping is facilitated by the BAS 231 and translation database 222 as already discussed above. Thus, any target or recipient Bluetooth enabled devices that are subsequently reached by this communication that was facilitated by the Bluetooth master chip, i.e., the resent inquiry from the original Bluetooth device, such target devices will perceive the origin of the inquiry to have been the Bluetooth repeater itself. Upon the target devices receiving the relayed and/or repeated inquiry message from the Bluetooth repeater, the target device will return an inquiry response back to the Bluetooth repeater. At this point the Bluetooth repeater will replace its own Bluetooth address with that of the responding Bluetooth device and send it back to the original inquiring Bluetooth device.

Figure 2C:
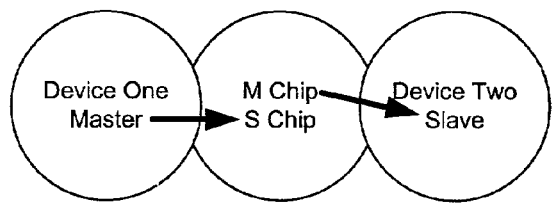
FIG. 2C shows one non-limiting example embodiment of this basic communication transpire as between Device One from its master chip which sends an inquiry ultimately to Device Two.

FIG. 2C shows this basic communication transpire as between Device One from its master chip 280 which sends an inquiry ultimately to Device Two 299. The illustration shows that Device One is not within range of Device Two. Therefore, a Bluetooth repeater device 250 intercepts the Bluetooth communications from Device One 281 via its slave chip at 283 and relays this communication via its master chip from 282 to the target device, Device Two, at its slave chip 299. Communications will thereafter flow back from the target device, Device Two, 299 through the Bluetooth repeater 250 to the originating client, Device One, 281.

It should be noted that in an alternative embodiment, if the client acts as a slave and it is listening for inquiries, then the Bluetooth repeater master chip 282 will send inquiries frequently. The alternative communications scenario is similar to that above embodiment where the client is acting as a master. However, in the alternative embodiment when the Bluetooth repeater 281 inquiries periodically and stores the responses to a dedicated database. Thus, when a device subsequently sends an inquiry to the Bluetooth repeater, the Bluetooth repeater can immediately send a response using the information that it already stored in the dedicated database.

Bluetooth Repeater Interactions

Figure 3:
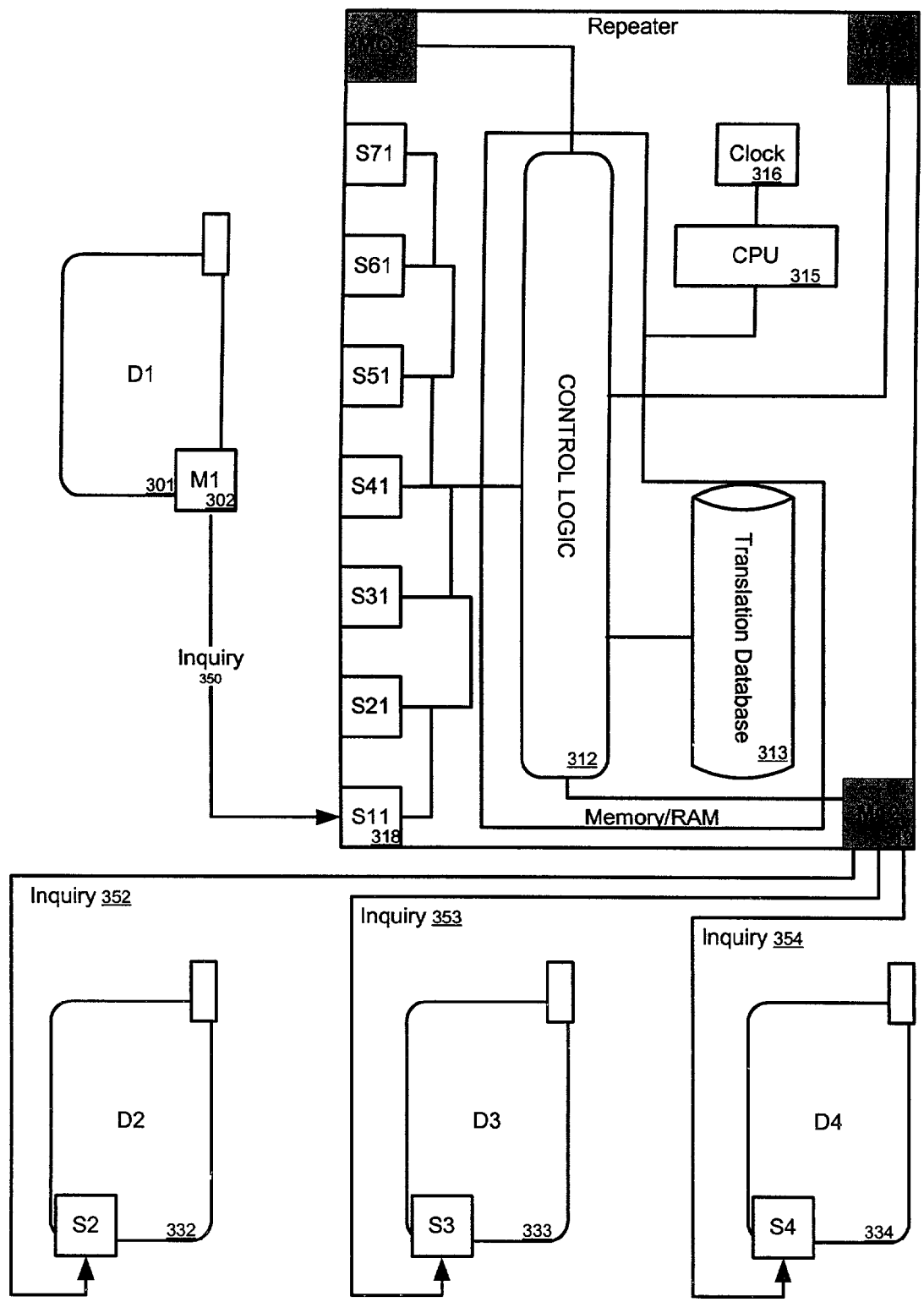
FIG. 3 illustrates non-limiting example embodiments of various Bluetooth devices and Bluetooth repeater interactions.

FIG. 3 illustrates non-limiting example embodiments of various Bluetooth devices 301, 332, 333, 334 and Bluetooth repeater 310 interactions. As illustrated by the arrows 350, 352, 353, 354, data flows between the Bluetooth devices (D1 301, D2 332, D3 333, and D4 334) and the Bluetooth repeater 310. The components illustrated in a Bluetooth client 301, 332, 333, 334 and Bluetooth repeater 310 were discussed in greater detail in FIGS. 1D and 2A respectively. The description of the devices of FIG. 3 also apply to FIGS. 6, 7, 8 and 9. The main differences between FIG. 3 and the subsequent similar FIGS. 6, 7, 8 and 9 are limited primarily to the actual flow of data between the various Bluetooth devices 301, 332, 333, 334 as enabled by the Bluetooth repeater 310.

Client Inquiry

In FIG. 3 we have an originating Bluetooth device D1 that has a Bluetooth transceiver 302. In this particular instance, the Bluetooth chip is activated as a master M1, but it may also be switched and function as a slave. Ultimately, D1 wishes to communicate with other Bluetooth devices D2, D3 and/or D4 that lie beyond its communications range and thus the Bluetooth repeater 310 will facilitate any communications between the originating device, D1, and any of the potential target devices D2, D3 or D4. The target devices are comprised or constructed similar to the originating devices, namely, they each have Bluetooth chips to enable communications.

As discussed in greater detail in FIG. 2A, the Bluetooth repeater itself 310 is comprised of a clock 316, which is disposed in communication with a CPU 315. Furthermore, the Bluetooth repeater will have a memory 311 in which control logic 312 (e.g., the BAS) and a translation database 313 may be stored. The CPU 315 is disposed in communication with the memory 311. The Bluetooth repeater is further comprised of at least two Bluetooth chips 318, 319 as discussed previously in FIG. 2B. In this example embodiment, the Bluetooth repeater 310 has an array of Bluetooth chips that provide communications S11, S21, S31, S41, S51, S61, S71 and M01, 318 for the originating device 301 and another set of Bluetooth chips M12, M02, 319 that provide communications with potential target devices. It should be noted that all of these Bluetooth chips at various points may be toggled to act as either a slave or a master as designated by an S or an M, respectively, in front of the number of a given Bluetooth chip as pictured in FIGS. 3, 4, 6, 7, 8, and 9. Thus, communications are enabled between an originating device (i.e., D1) and potential target devices (i.e., D2, D3 and D4) as exemplified by an inquiry emanating from D1's Bluetooth chip acting as a master M1. The inquiry 350 is sent from M1 and received by one of the Bluetooth repeater's 310 Bluetooth chips acting as a slave S11. The Bluetooth repeater's CPU directed by its control logic (i.e., BAS and facilitate by the translation database) forwards the inquiry 350 received at its slave chip S11 to devices D2 332, D3 333 and D4 334 via a master Bluetooth chip M12.

Potential Target Client Response

Figure 4:
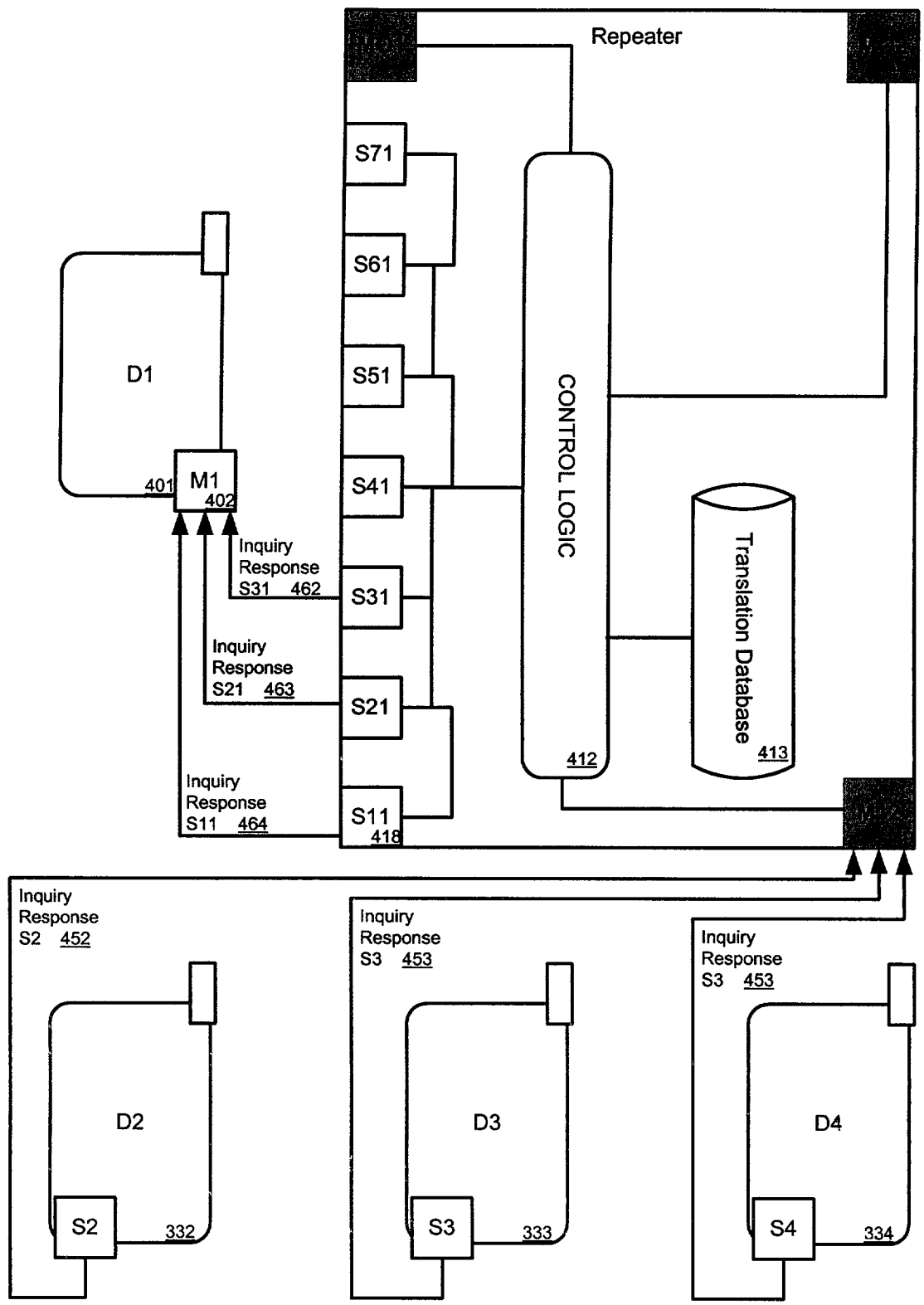
FIG. 4 continues to illustrate communications flow between the various devices already described in FIG. 3.

FIG. 4 continues to illustrate communications flow between the various devices already described in FIG. 3. Namely, FIG. 4 shows data flowing back from target devices D2, D3 and D4 to the originating device D1 via the Bluetooth repeater 410. Here we see each of the target devices D2, D3 and D4 responding to the inquiry by sending inquiry responses 452, 453, 454 back to the Bluetooth repeater 410 via its Bluetooth chips M12 acting as a master. Upon receiving inquiry responses from target devices 452, 453 and 454 at Bluetooth chip M12, the Bluetooth repeater 410 will assign its own Bluetooth chips S31, S21, 511 to further relay the inquiry responses from the target devices D2, D3 and D4, respectively 462, 463, 464. The Bluetooth repeater will then substitute its Bluetooth chip address S31, S21, S11 for the Bluetooth chip addresses found in the inquiry responses from the target devices, respectively S2, S2 and S4. In other words, inquiry response 452 from D2 will have address S2 replaced with S31 at the Bluetooth repeater 410 before the inquiry response is relayed to D1; inquiry response 453 from D3 will have address S3 replaced with S21 at the Bluetooth repeater 410 before the inquiry response is relayed to D1; and inquiry response 454 from D4 will have address S4 replaced with S11 at the repeater before the inquiry response is relayed to D1. These address substitutions will be stored and maintained in a translation database 413, which will correlate the Bluetooth repeater's newly assigned Bluetooth transceiver addresses S13, S21, 511 with those of the target Bluetooth devices that originated the inquiry responses 452, 453, 454 via their Bluetooth transceivers S2, S3 and S4, respectively. Thus, the Bluetooth repeater 410 will relay the inquiry responses 452, 453, and 454 that were sent from Bluetooth chips S2, S3 and S4 via its own Bluetooth chips S31, S21, 511 as relayed inquiry responses 462, 463 and 464, respectively. These relayed inquiry responses 462, 463 and 464 will be received by the originating device D1 at its Bluetooth transceiver M1 402.

Choosing a Target

Figure 5:
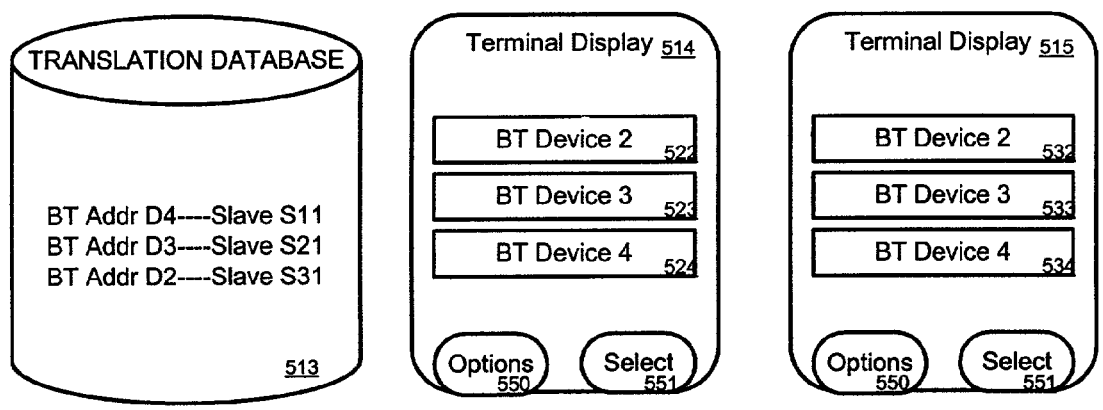
FIG. 5 illustrates one non-limiting example embodiment of the various states of the Bluetooth device and of the translation database.

Continuing the example of FIG. 4, FIG. 5 illustrates one non-limiting example embodiment of the various states of the Bluetooth device (D1, 401) and of the translation database 513. The translation database 513 is illustrated storing and associating: the Bluetooth address for D4 (S4) with the Bluetooth address of the repeater Bluetooth transceiver address (S11); the Bluetooth address for D3 (S3) with the Bluetooth address of the repeater Bluetooth transceiver address (S21); and the Bluetooth address for D2 (S2) with the Bluetooth address of the repeater Bluetooth transceiver address (S31).

FIG. 5 shows that upon having received the relayed inquiry responses 462, E-463 and 464, then the originating device (D1) will provide a user with the ability to select between the various target devices 514. In one non-limiting example embodiment the Bluetooth device D1 may provide a terminal display 514 and 515. In the first instance the terminal display may show the various Bluetooth target devices that are available for communication as provided by the Bluetooth repeater displayed as available Bluetooth devices 522, 523, 524. Further, there may be various selection options 550 and a facility such as a button to confirm the selection of one of the Bluetooth devices presented in the terminal display 551. Thus, the user may select by way of buttons and/or cursors with which of the various devices presented by the repeater they wish to communicate. The terminal display 514 shows that Bluetooth device 3 (D3) 533 may be highlighted and subsequently selected 552 by moving a cursor to select the device 533 and engaging the selection mechanism 552.

Paging a Target

Figure 6:
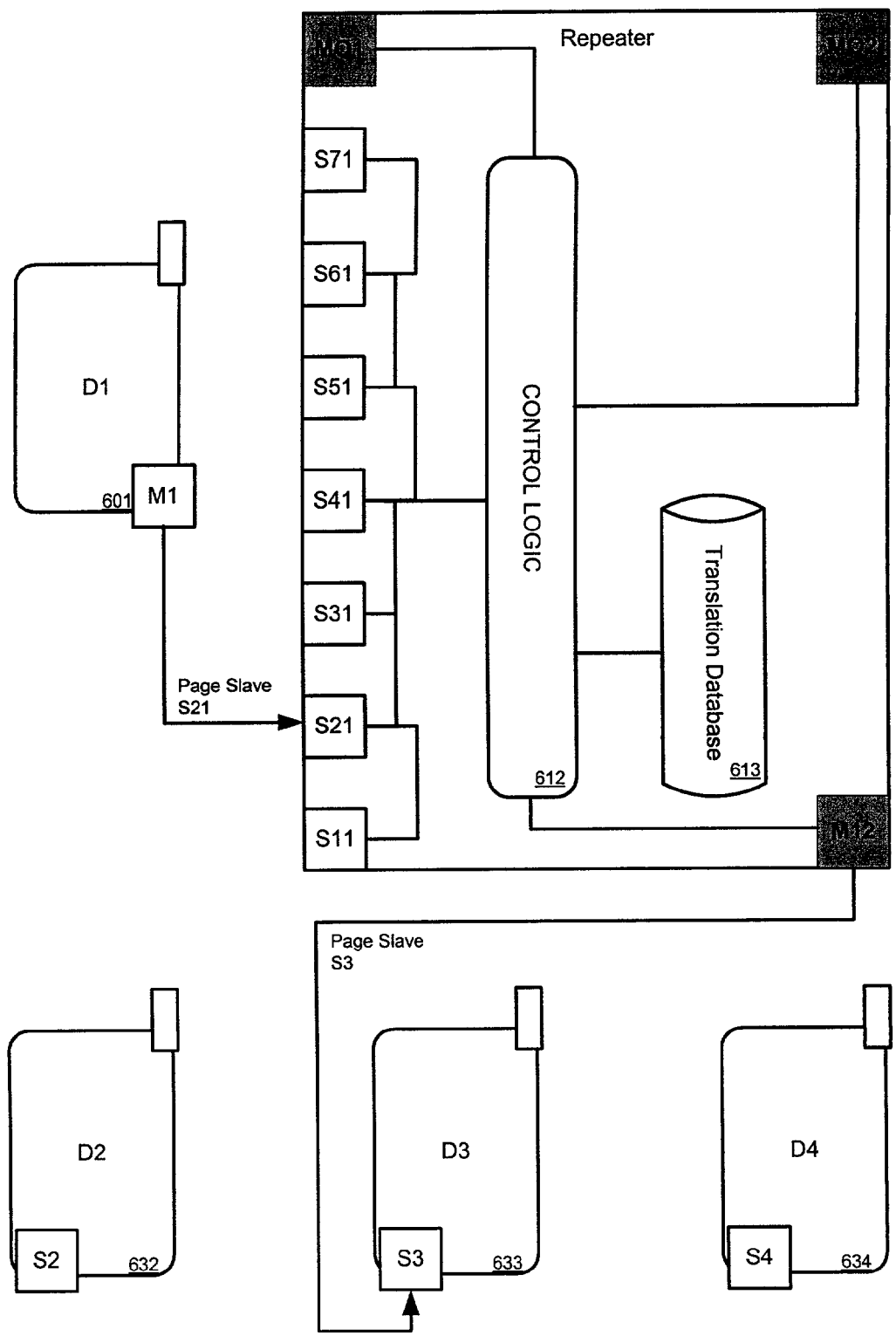
FIG. 6 shows one non-limiting example embodiment of how communications will continue after a user has selected their desired target device.

Continuing with the example selection of the Bluetooth target device (D3) as described in FIG. 5, FIG. 6 shows how communications will continue after a user has selected their desired target device. The user's originating Bluetooth device 601 will issue a page message, which emanates from its Bluetooth chip M1 and flows to the Bluetooth repeater's 610 Bluetooth chip S21. Upon receiving the page message at its slave chip S21, the Bluetooth repeater 610 employs the translation database 613 to forward the page message via its Bluetooth chips M12 to device 3 at its Bluetooth chip S3. Thus, the page message is X relayed from D1 to D3 via the Bluetooth repeater's control logic 612 and translation database 613.

It should be noted that upon receiving the user's selection for target device D3 as discussed in FIG. 5, the Bluetooth repeater 610 will free-up Bluetooth transceivers S31, S11 for the non-selected devices.

Page Response

Figure 7:
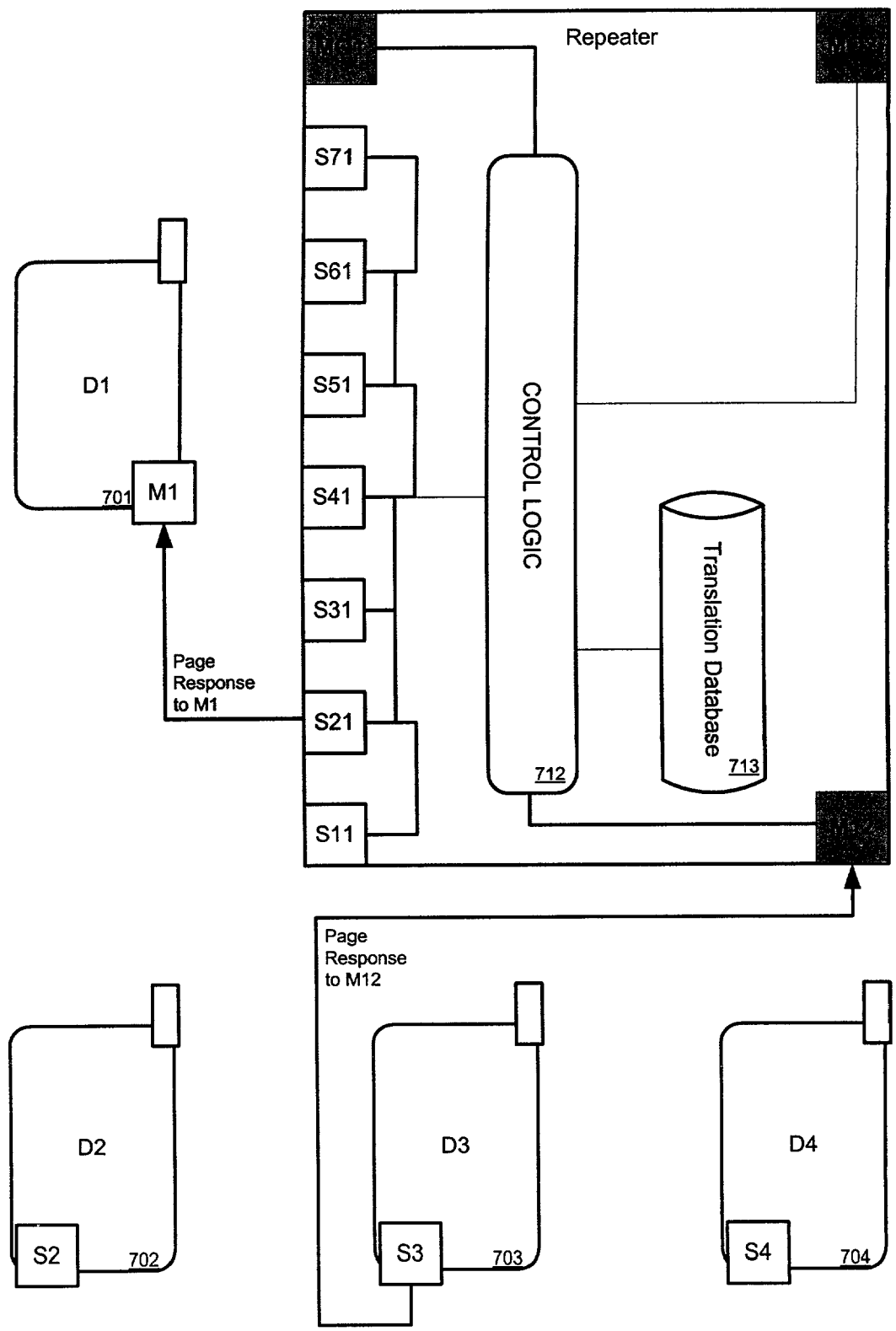
FIG. 7 continues to show one non-limiting example embodiment of the example communication that was initiated in FIG. 6.

FIG. 7 continues to show the example communication that was initiated in FIG. 6. Here D3 733 responds to the page message that was issued in FIG. 6 by sending a page message response from S3 to M12 of the Bluetooth repeater 710. Here again the Bluetooth repeater uses the translation database 713 to forward the page message response from D3 to originating D1 701. This is achieved by stripping out the sending address of the target device D3 (namely S3) and replacing it with the Bluetooth repeater's 710 own Bluetooth address (namely S21). Thus, the Bluetooth repeater 710 forwards the page message response from S21 to the originating device D1 at its Bluetooth transceiver M1. Upon receiving the relayed page response message at D1 from D3 via the Bluetooth repeater 710, communications between D1 and D3 have been established.

Optimized Repeater Communications

Figure 8:
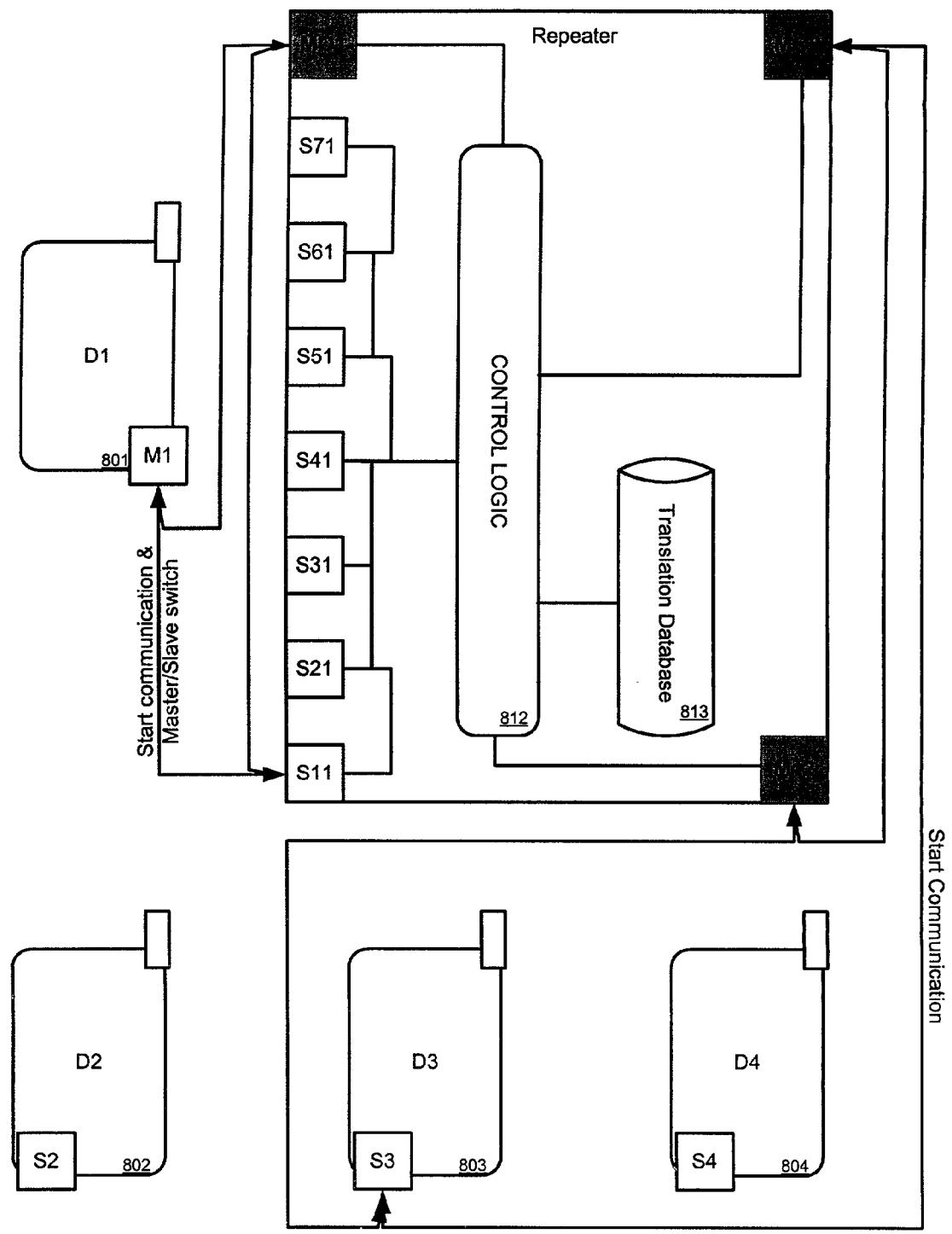
FIG. 8 is a data flow diagram illustrating one non-limiting example embodiment of optimized Bluetooth communications as enabled by a Bluetooth repeater.

Continuing the example of FIG. 7, FIG. 8 is a data flow diagram illustrating one non-limiting example embodiment of optimized Bluetooth communications as enabled by a Bluetooth repeater 810. To maximize the effectiveness of Bluetooth communications between a message originating Bluetooth device (D1) and a selected target device (D3), the Bluetooth repeater 810 can reassign its various Bluetooth transceivers to continue the communications between originating device (D1) and the selected target device (D3). Thus, upon establishing communications between D1 and D3, the Bluetooth repeater may ask for a master slave switch between itself and the originating device (D1). Here we see the Bluetooth repeater's transceiver (S21) 801, which was assigned to communicate with the originating device (D1), switch its functionality and begin to function as a master (M21). The Bluetooth repeater also informs the originating device (D1) to switch its Bluetooth transceiver from functioning as a master (M1) to instead function as a slave (S1). Thereafter, the Bluetooth repeater 810 forwards data from the originating device (D1) from its transceiver (M21) to an optimized transceiver (M01). The translation database is updated to reflect the change of communications from the originally assigned repeater (M21) to that of the optimized transceiver (M01). Similarly, communications from the Bluetooth repeater's 810 transceiver, which was assigned for communication with selected target device (M12), are forwarding to its optimized transceiver (M02) and the translations database 813 is updated accordingly.

Because both Bluetooth originating (D1) and selected target (D3) devices are operating as slaves, the Bluetooth repeater 810 can easily substitute new optimized transceivers (MO1 and MO2) for the previously assigned transceivers (M21 and M12). Upon reassigning transceivers (M21 with MO1 and M12 with MO2), the Bluetooth repeater may free up unused transceivers (M21 and M12) to be reassigned while still enabling communications between the originating (D1) and selected target (D3) devices through its optimized transceivers. As discussed above in FIG. 2C, by switching the originating device to operate as a slave, the resources of the slave are freed so as to not have to intermittently probe for communications. Furthermore, by enabling the Bluetooth repeater to operate as a master device with both the originating device (D1) and the selected target device (D3), the Bluetooth repeater may periodically inquire and store responses to a dedicated database (i.e., caching available clients). This client caching allows the Bluetooth repeater to react more quickly to subsequent communications from any originating client to any other available and cached client.

Figure 9:
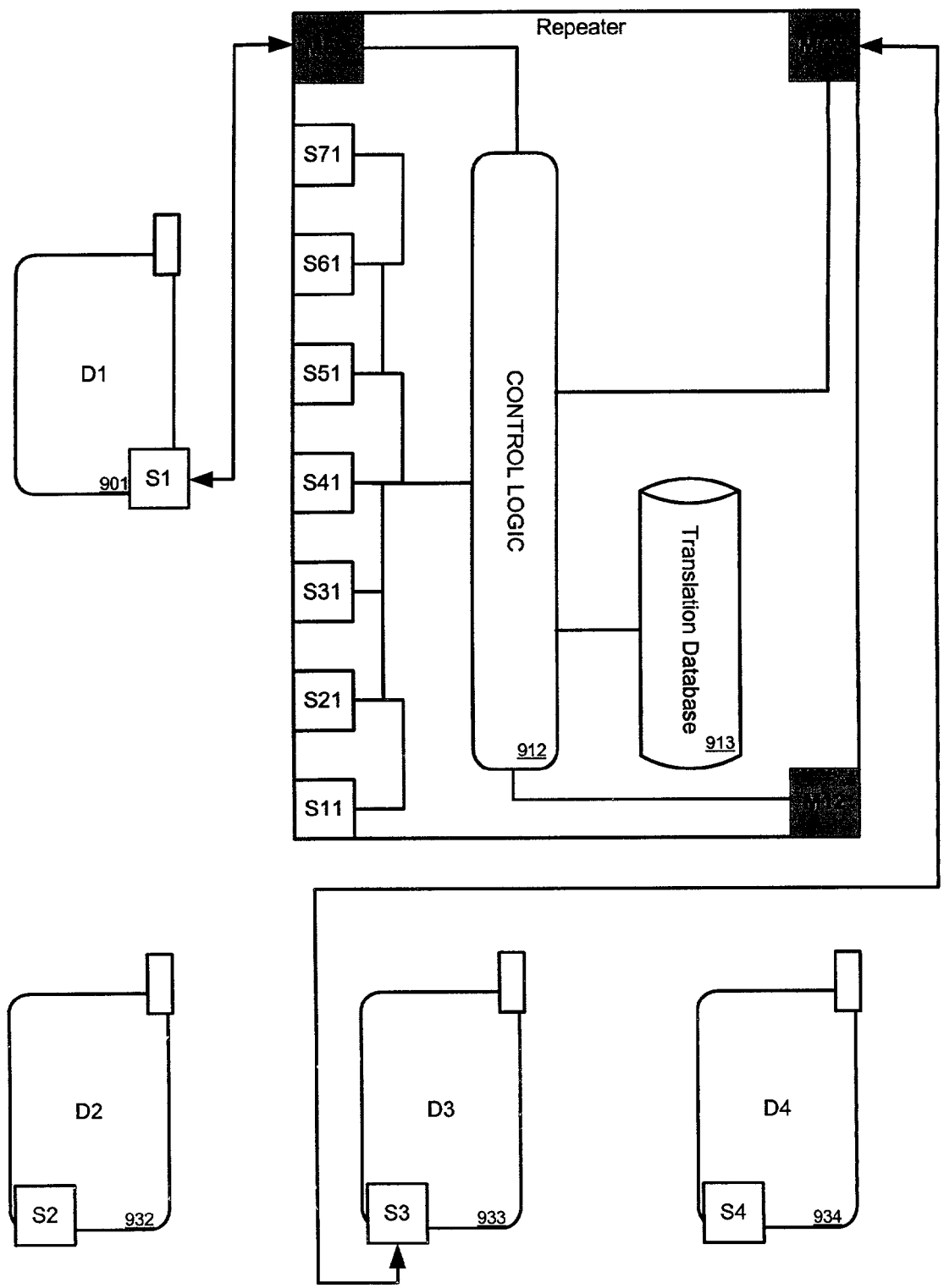
FIG. 9 continues to show one non-limiting example embodiment of the data flow after the release of unused Bluetooth repeater transceivers.

FIG. 9 continues to show the data flow after the release of unused Bluetooth repeater transceivers (M21 and M12) of FIG. 8. Communications flow between originating (D1) and target (D3) devices via their Bluetooth transceiver chips (S1 and S3, respectively), which are in a sense bridged by the Bluetooth repeater 910 and its Bluetooth transceiver chips (MO1 and M12). The Bluetooth repeater's translation database 913 is employed to swap addresses, namely, a communication message emanating from the originating device (D1) will have its Bluetooth address (S1) replaced with that of the Bluetooth repeater address (M12), which has been assigned to communicate with the selected target device (D3); and a communication message emanating from the selected target device (D3) will have its Bluetooth address (S3) replaced with that of the Bluetooth repeater address (MO1), which has been assigned to communicate with the originating device (D1). In this manner, communications will freely flow between the originating (D1) and selected target (D3) devices with a minimum of resources.

Bluetooth Repeater Control Logic

Figure 10:
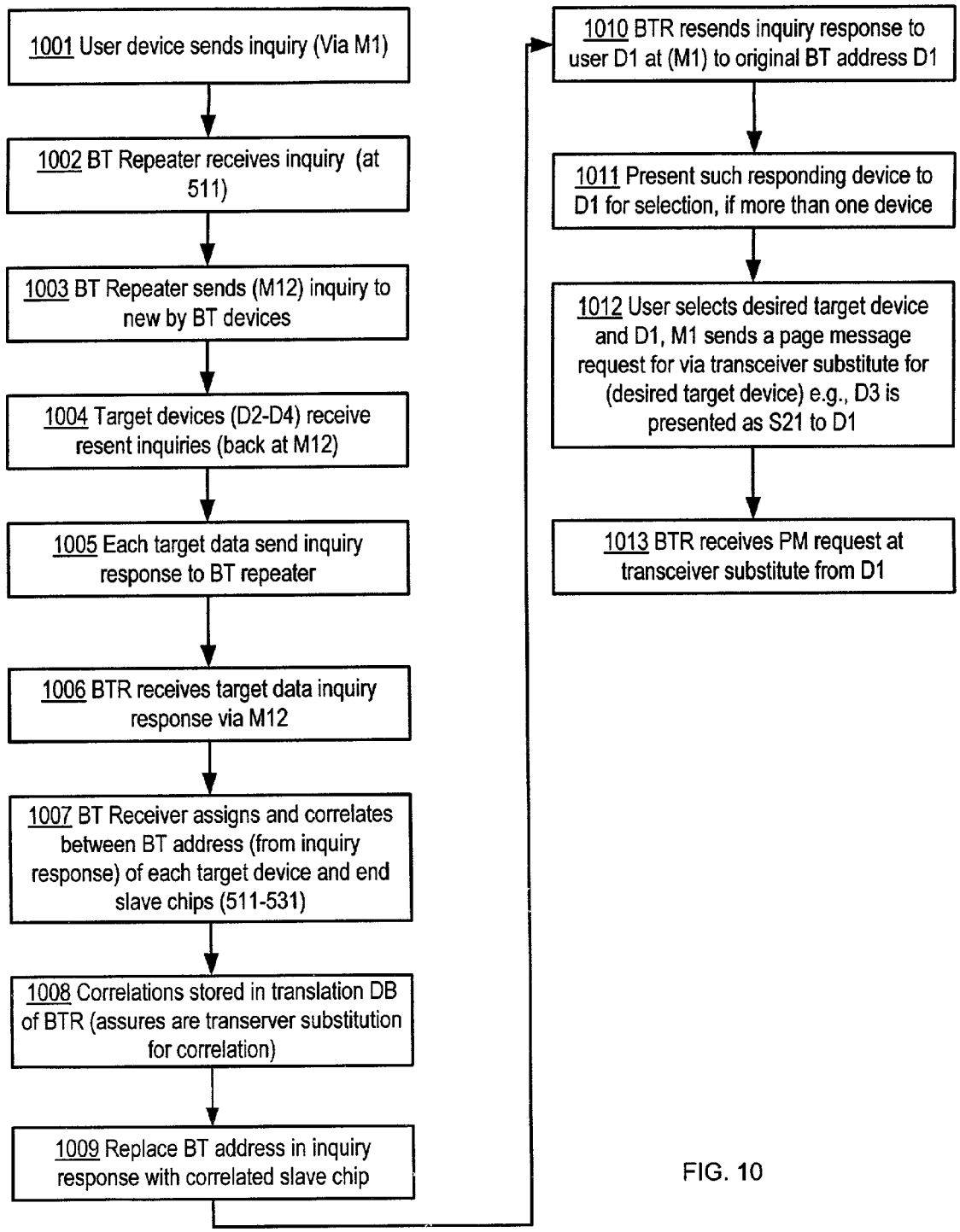
FIG. 10 illustrates one non-limiting example embodiment of a control logic flow diagram for a Bluetooth repeater.

FIG. 10 illustrates one non-limiting example embodiment of a control logic flow diagram for a Bluetooth repeater. The control logic may be one example of a BAS as variously discussed in FIGS. 2A, 3, 4, 6, 7, 8, and 9. It should be noted that example devices, messages, and transceivers from FIG. 3 are provided as parentheticals. Initially, a user device (e.g., D1) sends an inquiry message via its Bluetooth chip (M1) 1001. A Bluetooth repeater device receives this inquiry at its Bluetooth transceiver (S11) 1002. In one optional embodiment the Bluetooth repeater will generate a unique transmission identifier 1002B. The unique transmission ID is simply an identification number to be associated with the transmission that was received from the user device. In such an embodiment, a multitude of user devices can simultaneously send messages and the messages will be properly correlated by the Bluetooth repeater. In one non-limiting example embodiment, such correlations are facilitated by a translation database. The translation database may employ various data-structures to establish correlations, such as, but not limited to: structs, (linked) lists, tables, and/or the like. In such embodiments, the data-structures would store the various Bluetooth transceiver addresses that are related to one another, for example: using a Bluetooth transceiver address from an originating device as a key field, which is related to subsequent transmission ID and Bluetooth repeater address fields; using a Bluetooth transceiver address from an originating device as a key field as a row heading in a table, with subsequent row entries being addresses related to the originating device address; and/or the like. Continuing with this optional embodiment, the Bluetooth repeater correlates the Bluetooth address (M1) of the originating device (D1) with the unique transmission ID that was created 1002C, e.g., generating a unique random number. The correlated Bluetooth address at the originating device (M1) and a transmission ID are saved in a translation database 1002D. Upon receiving the inquiry 1002, the Bluetooth repeater retransmits the inquiry to nearby Bluetooth devices, (D2, D3, D4) via its Bluetooth transceiver chip (M12) 1003. In another optional non-limiting alternative embodiment, the Bluetooth repeater may "spoof" its Bluetooth address for that of the originating device by swapping its Bluetooth address for that of the originating device (D1) 1003B; in such an embodiment, the Bluetooth repeater would also store a correlation between the originating device's address and the spoofed address.

Upon resending the inquiry to the target devices 1003, the target devices (D2, D3, D4) receive the resent inquiries with their own Bluetooth transceivers (S2, S3, S4) 1004. Upon receiving the resent inquiries 1004, each target device sends an inquiry response back to the Bluetooth repeater 1005. Upon the target devices sending inquiry responses 1005, the Bluetooth repeater receives the inquiry responses from the target devices via its Bluetooth transceiver (M12) 1006. In an optional embodiment the Bluetooth repeater will then perform a transmission ID lookup in the translation database so that responses are routed back to the correct Bluetooth address that is correlated with the transmission ID, e.g., D1 1006B. In an alternative non-limiting optional embodiment the Bluetooth repeater will look up the Bluetooth address that was spoofed and replace it 1006C. It should be noted that example devices, messages, and transceivers, henceforth, are provided from FIG. 4 as parentheticals.

Upon receiving inquiry responses 1006, the Bluetooth repeater assigns a correlation between the Bluetooth addresses of each target device (S2, S3, S4) and each of the slave chips (S31, S21 and S11), respectively 1007. Upon correlating the target devices' Bluetooth addresses with those of the Bluetooth repeaters 1007, the correlations are stored in a translation database in the Bluetooth repeater 1008. In essence, the Bluetooth transceivers slave chips (S31, S21 and S11) become transceiver substitutes for the correlated target devices transceivers (S2, S3 and S4).

Upon storing the correlations in the translation database 1008, the Bluetooth repeater will replace the Bluetooth addresses in the inquiry responses from the target devices with the correlated slave chips' Bluetooth addresses, e.g., the inquiry responses Bluetooth addresses S2, S3 and S4 will be swapped out and replaced by Bluetooth addresses S31, S21 and S11 1009. Upon swapping the correlated Bluetooth addresses 1009, the Bluetooth repeater will resend the inquiry responses to the originating device (D1) to its Bluetooth transceiver (M1) 1010.

Upon resending the inquiry responses to the originating user (D1) 1010, if there is more than one target device providing an inquiry response, then the originating device will provide a user with a selection mechanism with which the user may select the desired target device as already discussed in FIG. 5 1011. It should be noted that example devices, messages, and transceivers, henceforth, are provided from FIG. 6 as parentheticals.

Upon selecting a desired target (D3) 1011, the originating device (D1) may send a page message request via its transceiver (M1) to the desired target device via transceiver substitute as already discussed in FIG. 6 1012. Upon the originating device sending a page message request 1012, the Bluetooth repeater receives the page message request at the transceiver substitute S21 from D1 also as discussed in FIG. 6 1013.

Upon the Bluetooth repeater receiving the page message request via its assigned transceiver (S21) 1013, the Bluetooth repeater swaps the Bluetooth address of the originating device (D1) with the Bluetooth transceiver address (M12) assigned to communicate with the selected target device (D3); this selection is made based on the correlation that is stored in the translation database as discussed in FIG. 6 1014. Upon swapping the addresses 1014, the Bluetooth repeaters non-assigned transceiver substitutes, (S11 and S31) may be released 1015. Upon swapping the Bluetooth addresses 1014, the Bluetooth repeater may resend the page message from the originating device (D1) to the desired target device (D3) 1016 as discussed in FIG. 6. It should be noted that example devices, messages, and transceivers, henceforth, are provided from FIG. 7 as parentheticals.

Upon resending the page message to the desired target (D3) 1016, the desired target device may send a page response message via its Bluetooth transceiver (S3) back to the Bluetooth repeater's assigned transceiver (M12) as already discussed in FIG. 7 1017. Upon receiving the page response message from the desired target device 1017, the Bluetooth repeater will look up the correlated transceiver address (i.e., the address for the device originating communications (D1)) in its translation database for the page response message that it received 1018.

Upon performing the translation database lookup 1018, the Bluetooth repeater will swap the Bluetooth address of the desire target device in the page response message with that of the substitute Bluetooth transceiver address, which was obtained from the lookup. For example, the received page response message containing address the selected target device's (D3) transceiver address (S3) will be replaced with of the Bluetooth repeater's transceiver (S11) assigned to communicate with the originating device (D1) as already discussed in FIG. 7 1019. Upon swapping the addresses 1019, the Bluetooth repeater resends the page response message, which it received from the desire target device (D3), to the originating device (D1) 1020.

Upon resending the page response message 320, the originating device (D1) receives the relayed page response message and a connection is established between the originating device (D1) through its transceiver (M1) and the Bluetooth repeater's transceiver (S21) assigned to communicate with the originating device, wherein the Bluetooth repeater further establishes a connection between its transceiver (M12) assigned to communicate with the selected target device and the target device's (D3) transceiver (S3) 1021 as discussed in FIG. 7.

Upon establishing a connection 1021, the Bluetooth repeater may have its transceiver (S21) assigned to communicate with the originating device ask for and master/slave switch, thus transforming the transceiver (S21) from a slave as discussed in FIG. 7 into a master (M21) as discussed in FIG. 8 1022. This master/slave switch also sends a signal to the originating device (D3) to transform its transceiver (M1) from a master into a slave (S1) as discussed in FIG. 8. It should be noted that example devices, messages, and transceivers, henceforth, are provided from FIG. 8 as parentheticals.

Upon engaging the master/slave switch 1022, the Bluetooth repeater's transceiver (M12) forward data it received from the originating device (D1) to an other available transceiver in the Bluetooth repeater (MO1) and updates its translation database to reflect the change of transceiver assignments (from M21 to MO1) 1023. Similarly, the Bluetooth repeater forwards communication from the desired target device (D3) as obtained by an assigned transceiver (M12) to an available transceiver (MO2) and updates the translation database to reflect the change of transceiver assignments 1024. Upon updating the translation database 1023, 1024, the Bluetooth repeater releases any unused Bluetooth transceivers (M21 and M12) 1025. Upon releasing the unused Bluetooth transceivers 1025, the Bluetooth repeater allows communications to flow between the originating device (D1) and the desired target device (D3) via the newly reassigned and optimized Bluetooth transceivers (e.g., with addresses S1, MO1, MO2 and S3) as discussed in FIG. 9.

Self Point-To-Point Connection Elimination

In one non-limiting alternative embodiment, the control logic provides a facility to ensure that the BT repeater does not make a point-to-point connection with itself (SP2PCE). Consider a case where an originating terminal sends an inquiry message to a BT repeater device. In such a case, the repeater makes a correlation and swaps the inquiry message's source BT address (i.e., from the originating terminal) with its dedicated transceiver chip's address. Next, the repeater would send an inquiry message to other terminals in its range using the swapped address information. Thereafter, there is a possibility that the originating terminal could receive the inquiry message from the BT repeater and respond to its own inquiry message. Generally, after a terminal sends an inquiry message it should not enter into inquiry scan-mode, but in some scenarios this may be possible. To avoid such self inquiries, the BT repeater may engage the SP2PCE upon receiving inquiry responses from devices 1006. Upon receiving inquiry responses 1006, the SP2PCE first determines if any of the responses are from the originating terminal. The SP2PCE checks the translation database and compares if any of the received inquiry responses response addresses match the originating terminal's inquiry address; if there is such a match, then the SP2PCE discards said matching inquiry response to eliminate a situation where a terminal tries to establish a point-to-point connection with itself.

Known Devices

In one non-limiting alternative embodiment, the control logic provides a facility to respond to known BT devices (KBTD). The translation database may maintain devices within its cover area. Thus, when the BT repeater receives an inquiry message from an originating device 1006, the KBTD may immediately send a response(s) to the originating device using the current contents of the translation database. This is achieved because in the translation database there already exists a list of devices currently within the coverage of the BT repeater from previous inquiry messages and/or responses. In other words, the KBTD sends inquiry responses to the originating device without having forwarded the inquiry message to other devices in the coverage areas and without having had to wait for the subsequent inquiry responses. In this manner, the KBTD caches BT devices known to be in its coverage area.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method of wireless communication between Short-Range Radio-Frequency (RF) devices, comprising:
   receiving a communication message from a RF device at a repeater device (RF repeater), wherein the RF device includes a BTRF transceiver and the repeater device includes a plurality of RF transceivers where at least one of the plurality of BTRF transceivers is dedicated to serve at least one of the RF devices, correspondingly;
   determining with which desired target RF device (target device), which is disposed in communication with the RF repeater, is the received communication message correlated, if a target device is known;
   correlating the received communications message with an identifier in the RF repeater (RF-repeater-identifier), if no correlations have been made between the RF device from which the communication message was received and a RF-repeater-identifier,
   wherein a database may store correlated RF transceiver addresses and resolves a RF transceiver address with a correlated RF-repeater-identifier (translation database);
   sending the communications message to an other RF device, which is disposed in communication with the RF repeater, from the RF repeater.

2. The method of claim 1, wherein the other RF device is a target device.

3. The method of claim 2, wherein a RF transceiver address for the target device (transceiver-address-at-target-device) is obtained from a database.

4. The method of claim 3, wherein the RF-repeater-identifier is a transceiver-address-at-target-device.

5. The method of claim 3, wherein the transceiver-address-at-target-device is correlated with the RF device.

6. The method of claim 3, wherein the determination of the target device is made by identifying a transceiver-address-at-target-device in the translation database.

7. The method of claim 1, wherein the RF repeater includes at least two RF transceivers.

8. The method of claim 1, wherein the RF repeater receives the communications message at a RF transceiver whose address is correlated with the RF device.

9. The method of claim 1, wherein the RF repeater sends the communications message from a RF transceiver whose address is correlated with the target device.

10. The method of claim 1, wherein the RF-repeater-identifier is an automatically generated unique number.

11. The method of claim 1, wherein the RF-repeater-identifier is a RF transceiver address in the RF repeater (transceiver-address-at-RF-repeater).

12. The method of claim 1, further comprising:
   swapping addresses in the received communications message, wherein a RF transceiver address for the RF device (transceiver-address-at-RF-device) is exchanged with a RF-repeater-identifier.

13. The method of claim 1, wherein the target device is correlated with the RF device.

14. The method of claim 13, wherein a transceiver address for any given RF enabled device may be obtained from a communication message obtained from the given RF enabled device.

15. The method of claim 1, wherein the target device is correlated with a RF-repeater-identifier.

16. The method of claim 1, wherein the RF device is correlated with a RF-repeater-identifier.

17. The method of claim 1, wherein the correlation with any given RF device is made by using a RF transceiver address for the given RF device (transceiver-address-at-RF-device).

18. The method of claim 1, wherein the correlation with the received communication message is made by using an address, which may be obtained from the communication message.

19. The method of claim 1, wherein the target device is specified.

20. The method of claim 1, wherein the communications message is not sent to an other RF device, if the other device is also the RF device.

21. The method of claim 1, wherein the short-range radio-frequency communication is Bluetooth.

22. A method of wireless communication between Bluetooth (BT) devices, comprising transceiver and the repeater device includes a BT transceiver, correspondingly:
   receiving a BT message to inquire if BT devices are available (inquiry message) from an originating device at a repeater device, wherein the originating device includes a Bluetooth transceiver (originating device) and the repeater device includes a BT transceiver (BT repeater), correspondingly;
   correlating a BT transceiver address for the originating device (transceiver-address-at-originating-device) with a BT transceiver address in the BT repeater (transceiver-address-at-BT-repeater), wherein the transceiver-address-at-originating-device may be obtained from the inquiry message;
   storing the transceiver-address-at-originating-device and transceiver-address-at-BT-repeater correlation in a database that resolves values with correlated values (translation database);
   swapping addresses in the received inquiry message, wherein the transceiver-address-at-originating-device is exchanged with the transceiver-address-at-BT-repeater;
   sending the swapped inquiry message to an other BT device (other device) from the BT repeater;
   receiving an inquiry response at the BT repeater from an other device;
   assigning an available BT transceiver in the BT repeater (BT-repeater-transceiver) for each responding other device;
   correlating an address from each responding other device (transceiver-address-at-other-device) with an address of a respectively assigned BT-repeater-transceiver (transceiver-address-at-BT-repeater), wherein the transceiver-address-at-other-device may be obtained from the inquiry response;

storing the transceiver-address-at-other-device and transceiver-address-at-BT-repeater correlation in a translation database;

swapping addresses in the received inquiry response message, wherein the transceiver-address-at-other-device is exchanged with the transceiver-address-at-BT-repeater;

sending an swapped inquiry response to the originating device from the BT repeater, wherein each assigned BT-repeater-transceiver sends an inquiry response as relayed from each responding other device;

receiving a BT message to establish communications from and between the originating device and a target device with which to communicate (page message), wherein the page message is received from the originating device at the BT repeater;

releasing BT-repeater-transceivers assigned to non-paged other devices, wherein the translation database is updated removing a transceiver-address-at-BT-repeater for each of the non-paged other devices;

swapping addresses in the received BT page message, wherein transceiver-address-at-originating-device is exchanged with the transceiver-address-at-BT-repeater;

forwarding the swapped page message from the BT repeater to the target device;

receiving a response to the page message (page response) at the BT repeater from the target device;

swapping addresses in the received page response, wherein a BT transceiver address for the target device (transceiver-address-at-target-device) is exchanged with the transceiver-address-at-BT-repeater; and sending the swapped page response from the BT repeater to the originating device.

23. The method of claim 22, wherein page of the target device is automatic.

24. The method of claim 22, wherein page of the target device is provided by a user through a selection facility.

25. The method of claim 24, wherein the selection facility provides a terminal display, highlighting mechanism, and selection engagement mechanism.

26. The method of claim 22, wherein transceiver-address-at-target-device may be obtained from the received page response.

27. The method of claim 22, wherein the transceiver-address-at-BT-repeater may be obtained from the translation database based on a query using the transceiver-address-at-target-device.

28. The method of claim 22, further comprising:
toggling the originating device's BT transceiver from master mode to slave mode and toggling the BT-repeater-transceiver assigned to communicate with the originating device from slave mode to master mode.

29. The method of claim 28, further comprising:
re-routing communications from a former BT-repeater-transceiver to a new and available BT-repeater-transceiver, wherein the former BT-repeater-transceiver was assigned to communicate with a BT device, wherein an address for the former BT-repeater-transceiver stored in the translation database is replaced with an address for the new and available BT-repeater-transceiver.

30. A system for wireless communication between Short-Range Radio-Frequency (RF) devices, comprising:
means to receive a communication message from a RF device at a repeater device (RF repeater), wherein the RF device includes a RF transceiver and the repeater device includes a plurality of RF transceivers where at least one of the plurality of RF transceivers is dedicated to serve at least one of the RF devices, correspondingly;

means to determine with which desired target RF device (target device), which is disposed in communication with the RF repeater, is the received communication message correlated, if a target device is known;

means to correlate the received communications message with an identifier in the RF repeater (RF-repeater-identifier), if no correlations have been made between the RF device from which the communication message was received and a RF-repeater-identifier wherein a database may store correlated RF transceiver addresses and resolves a RF transceiver address with a correlated RF-repeater-identifier (translation database);

means to send the communications message to an other RF device, which is disposed in communication with the RF repeater, from the RF repeater.

31. The system of claim 30, wherein the other RF device is a target device.

32. The system of claim 31, wherein a RF transceiver address for the target device (transceiver-address-at-target-device) is obtained from a database.

33. The system of claim 32, wherein the RF-repeater-identifier is a transceiver-address-at-target-device.

34. The system of claim 32, wherein the transceiver-address-at-target-device is correlated with the RF device.

35. The system of claim 32, wherein the determination of the target device is made by identifying a transceiver-address-at-target-device in the translation database.

36. The system of claim 30, wherein the RF repeater includes at least two RF transceivers.

37. The system of claim 30, wherein the RF repeater receives the communications message at a RF transceiver whose address is correlated with the RF device.

38. The system of claim 30, wherein the RF repeater sends the communications message from a RF transceiver whose address is correlated with the target device.

39. The system of claim 30, wherein the RF-repeater-identifier is an automatically generated unique number.

40. The system of claim 30, wherein the RF-repeater-identifier is a RF transceiver address in the RF repeater (transceiver-address-at-RF-repeater).

41. The system of claim 30, further comprising:
means to swap addresses in the received communications message, wherein a RF transceiver address for the RF device (transceiver-address-at-RF-device) is exchanged with a RF-repeater-identifier.

42. The system of claim 30, wherein the target device is correlated with the RF device.

43. The system of claim 42, wherein a transceiver address for any given RF enabled device may be obtained from a communication message obtained from the given RF enabled device.

44. The system of claim 30, wherein the target device is correlated with a RF-repeater-identifier.

45. The system of claim 30, wherein the RF device is correlated with a RF-repeater-identifier.

46. The system of claim 30, wherein the correlation with any given RF device is made by using a RF transceiver address for the given RF device (transceiver-address-at-RF-device).

47. The system of claim 30, wherein the correlation with the received communication message is made by using an address, which may be obtained from the communication message.

48. The system of claim 30, wherein the target device is specified.

49. The System of claim 30, wherein the short-range radio-frequency communication is Bluetooth.

50. A system for wireless communication between Bluetooth (BT) devices, comprising transceiver and the repeater device includes a BT transceiver, correspondingly:
- means to receive a BT message to inquire if BT devices are available (inquiry message) from an originating device at a repeater device, wherein the originating device includes a Bluetooth transceiver (originating device) and the repeater device includes a BT transceiver (BT repeater), correspondingly;
- means to correlate a BT transceiver address for the originating device (transceiver-address-at-originating-device) with a BT transceiver address in the BT repeater (transceiver-address-at-BT-repeater), wherein the transceiver-address-at-originating-device may be obtained from the inquiry message;
- means to store the transceiver-address-at-originating-device and transceiver-address-at-BT-repeater correlation in a database that resolves values with correlated values (translation database);
- means to swap addresses in the received inquiry message, wherein the transceiver-address-at-originating-device is exchanged with the transceiver-address-at-BT-repeater;
- means to send the swapped inquiry message to an other BT device (other device) from the BT repeater;
- means to receive an inquiry response at the BT repeater from an other device;
- means to assign an available BT transceiver in the BT repeater (BT-repeater-transceiver) for each responding other device;
- means to correlate an address from each responding other device (transceiver-address-at-other-device) with an address of a respectively assigned BT-repeater-transceiver (transceiver-address-at-BT-repeater), wherein the transceiver-address-at-other-device may be obtained from the inquiry response;
- means to store the transceiver-address-at-other-device and transceiver-address-at-BT-repeater correlation in a translation database;
- means to swap addresses in the received inquiry response message, wherein the transceiver-address-at-other-device is exchanged with the transceiver-address-at-BT-repeater;
- means to send an swapped inquiry response to the originating device from the BT repeater, wherein each assigned BT-repeater-transceiver sends an inquiry response as relayed from each responding other device;
- means to receive a BT message to establish communications from and between the originating device and a target device with which to communicate (page message), wherein the page message is received from the originating device at the BT repeater;
- means to release BT-repeater-transceivers assigned to non-paged other devices, wherein the translation database is updated removing a transceiver-address-at-BT-repeater for each of the non-paged other devices;
- means to swap addresses in the received BT page message,
  - wherein transceiver-address-at-originating-device is exchanged with the transceiver-address-at-BT-repeater;
- means to forward the swapped page message from the BT repeater to the target device;
- means to receive a response to the page message (page response) at the BT repeater from the target device;
- means to swap addresses in the received page response, wherein a BT transceiver address for the target device (transceiver-address-at-target-device) is exchanged with the transceiver-address-at-BT-repeater, and
- means to send the swapped page response from the BT repeater to the originating device.

51. The system of claim 50, wherein page of the target device is automatic.

52. The system of claim 50, wherein page of the target device is provided by a user through a selection facility.

53. The system of claim 50, wherein the selection facility provides a terminal display, highlighting mechanism, and selection engagement mechanism.

54. The system of claim 50, wherein transceiver-address-at-target-device may be obtained from the received page response.

55. The system of claim 50, wherein the transceiver-address-at-BT-repeater may be obtained from the translation database based on a query using the transceiver-address-at-target-device.

56. The system of claim 50, further comprising:
- means to toggle the originating device's BT transceiver from master mode to slave mode and toggling the BT-repeater-transceiver assigned to communicate with the originating device from slave mode to master mode.

57. The system of claim 56, further comprising:
- means to re-route communications from a former BT-repeater-transceiver to a new and available BT-repeater-transceiver, wherein the former BT-repeater-transceiver was assigned to communicate with a BT device, wherein an address for the former BT-repeater-transceiver stored in the translation database is replaced with an address for the new and available BT-repeater-transceiver.

58. A program stored on a medium readable by a processor, the program, comprising:
- a module to receive a communication message from a Short-Range Radio-Frequency (RF) device at a repeater device (RF repeater), wherein the RF device includes a RF transceiver and the repeater device includes a plurality of RF transceivers where at least one of the plurality of RF transceivers is dedicated to serve at least one of the RF devices, correspondingly;
- a module to determine with which desired target RF device (target device), which is disposed in communication with the RF repeater, is the received communication message correlated, if a target device is known;
- a module to correlate the received communications message with an identifier in the RF repeater (RF-repeater-identifier), if no correlations have been made between the RF device from which the communication message was received and a RF-repeater-identifier
  - wherein a database may store correlated RF transceiver addresses and resolves a RF transceiver address with a correlated RF-repeater-identifier (translation database);
- a module to send the communications message to an other RF device, which is disposed in communication with the RF repeater, from the RF repeater.

59. The medium of claim 58, wherein the other RF device is a target device.

60. The medium of claim 59, wherein a RF transceiver address for the target device (transceiver-address-at-target-device) is obtained from a database.

61. The medium of claim 60, wherein the RF-repeater-identifier is a transceiver-address-at-target-device.

62. The medium of claim 60, wherein the transceiver-address-at-target-device is correlated with the RF device.

63. The medium of claim 60, wherein the determination of the target device is made by identifying a transceiver-address-at-target-device in the translation database.

64. The medium of claim 58, wherein the RF repeater includes at least two RF transceivers.

65. The medium of claim 58, wherein the RF repeater receives the communications message at a RF transceiver whose address is correlated with the RF device.

66. The medium of claim 58, wherein the RF repeater sends the communications message from a RF transceiver whose address is correlated with the target device.

67. The medium of claim 58, wherein the RF-repeater-identifier is an automatically generated unique number.

68. The medium of claim 58, wherein the RF-repeater-identifier is a RF transceiver address in the RF repeater (transceiver-address-at-RF-repeater).

69. The medium of claim 58, further comprising:
a module to swap addresses in the received communications message, wherein a RF transceiver address for the RF device (transceiver-address-at-RF-device) is exchanged with a RF-repeater-identifier.

70. The medium of claim 58, wherein the target device is correlated with the RF device.

71. The medium of claim 70, wherein a transceiver address for any given RF enabled device may be obtained from a communication message obtained from the given RF enabled device.

72. The medium of claim 58, wherein the target device is correlated with a RF-repeater-identifier.

73. The medium of claim 58, wherein the RF device is correlated with a RF-repeater-identifier.

74. The medium of claim 58, wherein the correlation with any given RF device is made by using a RF transceiver address for the given RF device (transceiver-address-at-RF-device).

75. The medium of claim 58, wherein the correlation with the received communication message is made by using an address, which may be obtained from the communication message.

76. The medium of claim 58, wherein the target device is specified.

77. The medium of claim 58, wherein the short-range radio-frequency communication is Bluetooth.

78. A program stored on a medium readable by a processor, the program, comprising:
a module to receive a Bluetooth (BT) message to inquire if BT devices are available (inquiry message) from an originating device at a repeater device, wherein the originating device includes a Bluetooth transceiver (originating device) and the repeater device includes a BT transceiver (BT repeater), correspondingly;
a module to correlate a BT transceiver address for the originating device (transceiver-address-at-originating-device) with a BT transceiver address in the BT repeater (transceiver-address-at-BT-repeater), wherein the transceiver-address-at-originating-device may be obtained from the inquiry message;
a module to store the transceiver-address-at-originating-device and transceiver-address-at-BT-repeater correlation in a database that resolves values with correlated values (translation database);
a module to swap addresses in the received inquiry message, wherein the transceiver-address-at-originating-device is exchanged with the transceiver-address-at-BT-repeater;
a module to send the swapped inquiry message to an other BT device (other device) from the BT repeater;
a module to receive an inquiry response at the BT repeater from an other device;
a module to assign an available BT transceiver in the BT repeater (BT-repeater-transceiver) for each responding other device;
a module to correlate an address from each responding other device (transceiver-address-at-other-device) with an address of a respectively assigned BT-repeater-transceiver (transceiver-address-at-BT-repeater), wherein the transceiver-address-at-other-device may be obtained from the inquiry response;
a module to store the transceiver-address-at-other-device and transceiver-address-at-BT-repeater correlation in a translation database;
a module to swap addresses in the received inquiry response message, wherein the transceiver-address-at-other-device is exchanged with the transceiver-address-at-BT-repeater;
a module to send an swapped inquiry response to the originating device from the BT repeater, wherein each assigned BT-repeater-transceiver sends an inquiry response as relayed from each responding other device;
a module to receive a BT message to establish communications from and between the originating device and a target device with which to communicate (page message), wherein the page message is received from the originating device at the BT repeater;
a module to release BT-repeater-transceivers assigned to non-paged other devices, wherein the translation database is updated removing a transceiver-address-at-BT-repeater for each of the non-paged other devices;
a module to swap addresses in the received BT page message,
wherein transceiver-address-at-originating-device is exchanged with the transceiver-address-at-BT-repeater;
a module to forward the swapped page message from the BT repeater to the target device;
a module to receive a response to the page message (page response) at the BT repeater from the target device;
a module to swap addresses in the received page response, wherein a BT transceiver address for the target device (transceiver-address-at-target-device) is exchanged with the transceiver-address-at-BT-repeater, and
a module to send the swapped page response from the BT repeater to the originating device.

79. The medium of claim 78, wherein page of the target device is automatic.

80. The medium of claim 78, wherein page of the target device is provided by a user through a selection facility.

81. The medium of claim 78, wherein the selection facility provides a terminal display, highlighting mechanism, and selection engagement mechanism.

82. The medium of claim 78, wherein transceiver-address-at-target-device may be obtained from the received page response.

83. The medium of claim 78, wherein the transceiver-address-at-BT-repeater may be obtained from the translation database based on a query using the transceiver-address-at-target-device.

84. The medium of claim 78, further comprising:
a module to toggle the originating device's BT transceiver from master mode to slave mode and toggling the BT-repeater-transceiver assigned to communicate with the originating device from slave mode to master mode.

85. The medium of claim 84, further comprising:
a module to re-route communications from a former BT-repeater-transceiver to a new and available BTrepeater-transceiver, wherein the former BT-repeater-transceiver was assigned to communicate with a BT device, wherein an address for the former BT-repeater-transceiver stored in the translation database is replaced with an address for the new and available BT-repeater-transceiver.

86. A Bluetooth repeater apparatus, comprising:
a processor;
a memory, communicatively connected to the processor;
a program, stored in the memory, including,
   a module to receive a communication message from a Bluetooth (RF) device at a repeater device (RF repeater), wherein the RF device includes a RF transceiver and the repeater device includes a plurality of RF transceivers where at least one of the plurality of RF transceivers is dedicated to serve at least one of the RF devices, correspondingly;
   a module to determine with which desired target RF device (target device), which is disposed in communication with the RF repeater, is the received communication message correlated, if a target device is known;
   a module to correlate the received communications message with an identifier in the RF repeater (RF-repeater-identifier), if no correlations have been made between the RF device from which the communication message was received and a RF-repeater-identifier
   wherein a database may store correlated RF transceiver addresses and resolves a RF transceiver address with a correlated RF-repeater-identifier (translation database);
   a module to send the communications message to an other RF device, which is disposed in communication with the RF repeater, from the RF repeater.

87. The apparatus of claim 86, wherein the other RF device is a target device.

88. The apparatus of claim 87, wherein a RF transceiver address for the target device (transceiver-address-at-target-device) is obtained from a database.

89. The apparatus of claim 88, wherein the RF-repeater-identifier is a transceiver-address-at-target-device.

90. The apparatus of claim 88, wherein the transceiver-address-at-target-device is correlated with the RF device.

91. The apparatus of claim 88, wherein the determination of the target device is made by identifying a transceiver-address-at-target-device in the translation database.

92. The apparatus of claim 86, wherein the RF repeater includes at least two RF transceivers.

93. The apparatus of claim 86, wherein the RF repeater receives the communications message at a RF transceiver whose address is correlated with the RF device.

94. The apparatus of claim 86, wherein the RF repeater sends the communications message from a RF transceiver whose address is correlated with the target device.

95. The apparatus of claim 86, wherein the RF-repeater-identifier is an automatically generated unique number.

96. The apparatus of claim 86, wherein the RF-repeater-identifier is a RF transceiver address in the RF repeater (transceiver-address-at-RF-repeater).

97. The apparatus of claim 86, further comprising:
   a module to swap addresses in the received communications message, wherein a RF transceiver address for the RF device (transceiver-address-at-RF-device) is exchanged with a RF-repeater-identifier.

98. The apparatus of claim 86, wherein the target device is correlated with the RF device.

99. The apparatus of claim 98, wherein a transceiver address for any given RF enabled device may be obtained from a communication message obtained from the given RF enabled device.

100. The apparatus of claim 86, wherein the target device is correlated with a RF-repeater-identifier.

101. The apparatus of claim 86, wherein the RF device is correlated with a RF-repeater-identifier.

102. The apparatus of claim 86, wherein the correlation with any given RF device is made by using a RF transceiver address for the given RF device (transceiver-address-at RF-device).

103. The apparatus of claim 86, wherein the correlation with the received communication message is made by using an address, which may be obtained from the communication message.

104. The apparatus of claim 86, wherein the target device is specified.

105. The apparatus of claim 86, wherein the short-range radio-frequency communication is Bluetooth.

106. A Bluetooth apparatus, comprising:
a processor;
a memory, communicatively connected to the processor;
a program, stored in the memory, including,
   a module to receive a Bluetooth (BT) message to inquire if BT devices are available (inquiry message) from an originating device at a repeater device, wherein the originating device includes a Bluetooth transceiver (originating device) and the repeater device includes a BT transceiver (BT repeater), correspondingly;
   a module to correlate a BT transceiver address for the originating device (transceiver-address-at-originating-device) with a BT transceiver address in the BT repeater (transceiver-address-at-BT-repeater), wherein the transceiver-address-at-originating-device may be obtained from the inquiry message;
   a module to store the transceiver-address-at-originating-device and transceiver-address-at-BT-repeater correlation in a database that resolves values with correlated values (translation database);
   a module to swap addresses in the received inquiry message, wherein the transceiver-address-at-originating-device is exchanged with the transceiver-address-at-BT-repeater;
   a module to send the swapped inquiry message to an other BT device (other device) from the BT repeater;
   a module to receive an inquiry response at the BT repeater from an other device;
   a module to assign an available BT transceiver in the BT repeater (BT-repeater-transceiver) for each responding other device;
   a module to correlate an address from each responding other device (transceiver-address-at-other-device) with an address of a respectively assigned BT-repeater-transceiver (transceiver-address-at-BT-repeater), wherein the transceiver-address-at-other-device may be obtained from the inquiry response;
   a module to store the transceiver-address-at-other-device and transceiver-address-at-BT-repeater correlation in a translation database;
   a module to swap addresses in the received inquiry response message, wherein the transceiver-address-at-other-device is exchanged with the transceiver-address-at-BT-repeater;
   a module to send an swapped inquiry response to the originating device from the BT repeater, wherein each assigned BT-repeater-transceiver sends an inquiry response as relayed from each responding other device;

a module to receive a BT message to establish communications from and between the originating device and a target device with which to communicate (page message), wherein the page message is received from the originating device at the BT repeater;

a module to release BT-repeater-transceivers assigned to non-paged other devices, wherein the translation database is updated removing a transceiver-address-at-BT-repeater for each of the non-paged other devices;

a module to swap addresses in the received BT page message,
wherein transceiver-address-at-originating-device is exchanged with the transceiver-address-at-BT-repeater;

a module to forward the swapped page message from the BT repeater to the target device;

a module to receive a response to the page message (page response) at the BT repeater from the target device;

a module to swap addresses in the received page response,
wherein a BT transceiver address for the target device (transceiver-address-at-target-device) is exchanged with the transceiver-address-at-BT-repeater, and a module to send the swapped page response from the BT repeater to the originating device.

107. The apparatus of claim 106, wherein page of the target device is automatic.

108. The apparatus of claim 106, wherein page of the target device is provided by a user through a selection facility.

109. The apparatus of claim 106, wherein the selection facility provides a terminal display, highlighting mechanism, and selection engagement mechanism.

110. The apparatus of claim 106, wherein transceiver-address-at-target-device may be obtained from the received page response.

111. The apparatus of claim 106, wherein the transceiver-address-at-BT-repeater may be obtained from the translation database based on a query using the transceiver-address-at-target-device.

112. The apparatus of claim 106, further comprising:
a module to toggle the originating device's BT transceiver from master mode to slave mode and toggling the BT-repeater-transceiver assigned to communicate with the originating device from slave mode to master mode.

113. The apparatus of claim 112, further comprising:
a module to re-route communications from a former BT-repeater-transceiver to a new and available BT-repeater-transceiver, wherein the former BT-repeater-transceiver was assigned to communicate with a BT device, wherein an address for the former BT-repeater-transceiver stored in the translation database is replaced with an address for the new and available BT-repeater-transceiver.

114. A memory for access by a program module to be executed on a processor, comprising:
a data structure stored in the memory, the data structure having interrelated data types, wherein instruction signals embody data, including,
a data type to store a Short-Range Radio-Frequency (RF transceiver address (transceiver-address-at-originating-device) for an originating device, wherein the originating device includes a Short-Range Radio-Frequency transceiver (originating device);

a data type to store a RF transceiver address (transceiver-address-at-RF-repeater) for a repeater device, wherein the repeater device includes a plurality of BTRF transceivers where at least one of the plurality of transceivers is dedicated to serve at least one of the originating devices (RF repeater);

a data type to store a RF transceiver address (transceiver-address-at-other-device) for an other device, wherein the other device includes a RF transceiver (other device).

115. The apparatus of claim 114, wherein the data type to store the transceiver-address-at-RF repeater is assigned to communicate with an originating device.

116. The apparatus of claim 114, wherein the data type to store the transceiver-address-at-RF-repeater is assigned to communicate with an other device.

117. The apparatus of claim 114, further comprising:
a second data type to store a transceiver-address-at-RF-repeater, wherein the first data type is to a transceiver address assigned to communicate with an originating address and the second data type is to store a transceiver address assigned to communicate with an other device.

118. The apparatus of claim 114, further comprising:
a data type to store an identifier in the RF repeater, wherein the identifier may be correlated to a message received from a RF device.

119. The apparatus of claim 114, wherein the short-range radio frequency communication is Bluetooth.

120. A Bluetooth apparatus, comprising:
a processor;
a memory, communicatively connected to the processor;
a program, stored in the memory, including,
a processor;
a memory, communicatively connected to the processor;
a program, stored in the memory, including,
a module to receive a communication message from a Bluetooth (BT) device at a repeater device (BT repeater), wherein the BT device includes a BT transceiver and the repeater device includes a BT transceiver, correspondingly;
a module to determine with which desired target BT device (target device), which is disposed in communication with the BT repeater, is the received communication message correlated, if a target device is known;
a module to correlate the received communications message with an identifier in the BT repeater (BT-repeater-identifier), if no correlations have been made between the BT device from which the communication message was received and a BT-repeater-identifier;
a module to send the communications message to an other BT device, which is disposed in communication with the BT repeater, from the BT repeater
a module to route OBEX communications to a specified destination if the communications message received is determined to use OBEX protocol.

* * * * *